United States Patent
Chen et al.

(10) Patent No.: US 11,076,422 B2
(45) Date of Patent: Jul. 27, 2021

(54) RANDOM ACCESS RESPONDING METHOD AND DEVICE, AND RANDOM ACCESS METHOD AND DEVICE

(71) Applicant: HUAWEI TECHNOLOGIES CO., LTD., Shenzhen (CN)

(72) Inventors: Lei Chen, Shenzhen (CN); Mao Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 16/579,860

(22) Filed: Sep. 24, 2019

(65) Prior Publication Data

US 2020/0029359 A1 Jan. 23, 2020

Related U.S. Application Data

(63) Continuation of application No. PCT/CN2018/079830, filed on Mar. 21, 2018.

(30) Foreign Application Priority Data

Mar. 24, 2017 (CN) .......................... 201710184799.8

(51) Int. Cl.
*H04W 74/00* (2009.01)
*H04W 72/02* (2009.01)
(Continued)

(52) U.S. Cl.
CPC ......... *H04W 74/006* (2013.01); *H04W 72/02* (2013.01); *H04W 72/046* (2013.01);
(Continued)

(58) Field of Classification Search
CPC ............. H04W 72/02; H04W 72/0446; H04W 72/0453; H04W 72/046; H04W 74/004;
(Continued)

(56) References Cited

U.S. PATENT DOCUMENTS 9,674,796 B2 * 6/2017 Nan ...................... H04W 52/36
9,781,702 B2 * 10/2017 Lyu ....................... H04W 72/02
(Continued)

FOREIGN PATENT DOCUMENTS

| CN | 105830359 A | 8/2016 |
|---|---|---|
| WO | 2016053179 A1 | 4/2016 |
| WO | 2016120761 A1 | 8/2016 |

OTHER PUBLICATIONS

ZTE ZTE Microelectronics: "Overview of NR initial access", 3GPP Draft; R1-1611272, vol. RAN WG1, No. Reno, USA; Nov. 14, 2016-Nov. 18, 2016, Nov. 13, 2016, XP051175253, 4 pages.
(Continued)

*Primary Examiner* — Kashif Siddiqui
(74) *Attorney, Agent, or Firm* — Hauptman Ham, LLP

(57) ABSTRACT

A random access/responding method and device are provided. In some embodiments, at least two random access preambles can be received before responding to random access of a terminal device, where each of the at least two random access preambles includes at least one sequence. In some embodiments, one random access preamble can be received before responding to random access of a terminal device, where the one random access preamble includes at least two sequences. The sequences in the received random access preambles can be checked. A successfully detected sequence or a random access preamble with the successfully detected sequence can then be responded to. In this way, responding to a plurality of successfully detected random access preambles or a plurality of successfully detected sequences included in one random access preamble is implemented.

17 Claims, 13 Drawing Sheets

(51) Int. Cl.
  *H04W 72/04* (2009.01)
  *H04W 74/08* (2009.01)

(52) U.S. Cl.
  CPC ... *H04W 72/0446* (2013.01); *H04W 72/0453* (2013.01); *H04W 74/004* (2013.01); *H04W 74/008* (2013.01); *H04W 74/0833* (2013.01)

(58) Field of Classification Search
  CPC ............ H04W 74/006; H04W 74/008; H04W 74/0833
  See application file for complete search history.

(56) References Cited

U.S. PATENT DOCUMENTS

| | | | |
|---|---|---|---|
| 2016/0192401 A1 | 6/2016 | Park et al. | |
| 2016/0262047 A1* | 9/2016 | Yi | H04W 74/085 |
| 2016/0270121 A1* | 9/2016 | Bergstrom | H04W 74/0833 |
| 2016/0323757 A1 | 11/2016 | Braun et al. | |
| 2016/0353393 A1* | 12/2016 | Feuersaenger | H04W 52/281 |
| 2019/0357271 A1* | 11/2019 | Yan | H04W 74/0833 |
| 2020/0260503 A1* | 8/2020 | Bienas | H04W 74/0841 |

OTHER PUBLICATIONS

ZTE: "Multi-TRP Aspects of Random Access", 3GPP Draft; R1-166421, vol. RAN WG1, No. Gothenburg, Sweden;Aug. 22, 2016-Aug. 26, 2016; Aug. 21, 2016, XP051140222, 4 pages.

* cited by examiner

RANDOM ACCESS RESPONDING METHOD AND DEVICE, AND RANDOM ACCESS METHOD AND DEVICE

CROSS-REFERENCE TO RELATED APPLICATIONS

This application is a continuation of International Application No. PCT/CN2018/079830, filed on Mar. 21, 2018, which claims priority to Chinese Patent Application No. 201710184799.8, filed on Mar. 24, 2017. The disclosures of the aforementioned applications are hereby incorporated by reference in their entireties.

TECHNICAL FIELD

This application relates to the field of communications technologies, and in particular, to a random access responding method and device and a random access method and device, in a wireless communications system.

BACKGROUND

Development of mobile services is imposing higher requirements on data rates and efficiency of wireless communications. In a future wireless communications system, a beamforming technology is used to limit energy for transmission of a signal in a direction of a specific beam. The beamforming technology can effectively increase a transmission range of a radio signal, and reduce signal interference, thereby achieving higher communication efficiency and obtaining a larger network capacity. However, in a communications network using the beamforming technology, transmit beams and receive beams need to be matched first, so that a receive beam obtains a better signal from a transmit beam. Without matching, it is impossible to achieve higher communication efficiency, and even worse, communication cannot proceed. During downlink and uplink synchronization between a terminal device and a base station, transmit beams and receive beams need to be matched. This function is accomplished by means of beam scanning. When there are relatively large quantities of transmit beams and receive beams, beam scanning consumes a lot of time and resources. In a wireless communications network, a terminal device accomplishes uplink synchronization between the device and a base station through random access. How random access is implemented determines a latency in uplink synchronization.

In random access, the terminal device generates and sends a random access preamble. The random access preamble includes a sequence, and the sequence is used to distinguish the terminal device from other terminal devices in random access. The base station checks a received signal, and if detecting a sequence, generates a random access response corresponding to the sequence.

In the prior art, there is no effective mechanism for a base station to respond to a plurality of received preambles or a plurality of sequences included in one received preamble, before responding to any random access preamble.

SUMMARY

Embodiments of the present invention provide a random access responding method and device, and a random access method and device, to implement responding to a plurality of random access preambles or a plurality of sequences included in one random access preamble.

According to one aspect, an embodiment of the present invention provides a random access responding method, including:

receiving at least two random access preambles before responding to random access of a terminal device, where each of the at least two random access preambles includes at least one sequence; or receiving one random access preamble before responding to random access of a terminal device, where the one random access preamble includes at least two sequences;

checking for the sequences in the received random access preambles; and responding to a successfully detected sequence or a random access preamble that includes a successfully detected sequence.

With this method, responding to a plurality of successfully detected random access preambles or a plurality of successfully detected sequences included in one random access preamble is implemented.

In some embodiments, the sequence is sequence information or a sequence signal used by the terminal device for random access. When performing random access, the terminal device selects one piece of sequence information or one sequence signal from a specific quantity (for example, 64) of pieces of sequence information or sequence signals as a sequence for the random access, and sends the sequence to a base station.

In an example implementation, the method further includes: when receiving a plurality of random access preambles or a plurality of sequences sent by one terminal device, responding to only one random access preamble or only one sequence.

In an example implementation, the method further includes: responding, through at least two downlink transmissions, to the successfully detected sequence or the random access preamble that includes a successfully detected sequence. This can avoid a latency resulting from reception by the terminal device a response from another downlink transmit beam when failing to receive a response from one downlink transmit beam, thereby improving efficiency of responding to the terminal device, and reducing a time for the terminal device to receive a response.

In an example implementation, the method further includes: receiving a message that is sent by the terminal device after the terminal device receives a random access response, where the message includes information about a random access preamble or a sequence that has been sent by the terminal device but has not yet been responded to; and skipping responding to a successfully detected random access preamble or sequence that is included in the message and that has been sent by the terminal device but has not yet been responded to.

In this way, for a plurality of random access preambles sent by one terminal device or a plurality of sequences included in one random access preamble, only one of the random access preambles or sequences is responded to. This avoids responding to a plurality of random access preambles or sequences of one terminal device, improving responding efficiency, and reducing resource consumption caused by repeated responding.

In an example implementation, the information about the random access preamble or the sequence that is included in the message and that has been sent by the terminal device but has not yet been responded to includes at least one of the following items of information: a sending time, a sending frequency, an index, and a power headroom of the random access preamble or the sequence that has been sent but has not yet been responded to.

In an example implementation, the method further includes: selecting, based on a power headroom of a successfully detected random access preamble or sequence that is included in the message, and signal received quality of the successfully detected random access preamble or sequence, a beam for receiving random access sent by the terminal device.

In some embodiments, further, a message sent to the terminal device may include a selected time of sending a random access preamble by the terminal device or a time of receiving the random access preamble, to instruct the terminal device to use a transmit beam for sending the random access preamble, to send a subsequent message.

In an example implementation, when at least two base stations each receive a plurality of random access preambles or a plurality of sequences sent by one terminal device, the at least two base stations skip responding, through exchange of messages, to a random access preamble or a sequence that has been responded to.

In some embodiments, the at least two base stations exchange messages through a backhaul link.

In an example implementation, when at least two base stations each receive a plurality of random access preambles or a plurality of sequences sent by one terminal device, the at least two base stations each send information about a successfully detected random access preamble or sequence to a third-party device, so that the third-party device determines a base station that is to respond to the successfully detected random access preamble or sequence. The third-party device is a device responsible for resource scheduling, configuration, and/or processing functions between base stations.

In some embodiments, the at least two base stations may send, to the third-party device, received messages that are sent by terminal device after the terminal device receives random access responses, so that the third-party device determines whether to respond to other random access preambles or sequences detected by the base stations. Further, after determining to respond to the other preambles or sequences detected by the base stations, the third-party device may further determine a base station that is to respond to these random access preambles or sequences.

In some embodiments, the foregoing method may further include: after receiving random access preambles or sequences sent by a terminal device, sending a successfully detected random access preamble or sequence to the third-party device, so that the third-party device determines a base station that is to respond to the random access preamble or the sequence. For example, when at least two base stations each receive a plurality of random access preambles or a plurality of sequences sent by one terminal device, the base stations that receive the random access preambles or the sequences sent by the terminal device send a successfully detected random access preamble or sequence to the third-party device, so that the third-party device determines a base station that is to respond to the random access preamble or the sequence.

In an example implementation, a random access preamble response sent by the base station includes at least one of the following pieces of information: an index number corresponding to a random access preamble, signal received quality of the random access preamble, and a time and/or frequency domain location of the random access preamble; or includes at least one of the following pieces of information: an index number of a sequence, signal received quality of the sequence, and a time and/or frequency domain location of the sequence.

In some embodiments, for the time and/or frequency domain location of the random access preamble, a new field may be added into a response message to the random access preamble to record time and/or frequency domain location information of the preamble; or a random access-radio network temporary identifier (Random access-radio network temporary identifier, RA-RNTI) may be used to carry time and/or frequency domain location information of the random access preamble.

In some embodiments, for the time and/or frequency domain location of the sequence, a new field may be added into a response message to the sequence to record time and/or frequency domain location information of the preamble; or an RA-RNTI may be used to carry time and/or frequency domain location information of the sequence.

In an example implementation, the method further includes: determining an order for sending random access preamble responses, based on one of the following pieces of information:

a time order of reception of preambles, strengths of detected signals, priority information carried in detected random access preambles, or a quantity of random access preambles detected within one receive beam.

In an example implementation, when two base stations each send a random access preamble that includes at least two sequences, and random access to the two base stations has identical time and frequency locations, the random access preambles received by the two base stations have only one sequence in common.

According to another aspect, an embodiment of the present invention provides a random access method, including:

sending at least two random access preambles before a base station responds to random access, where each of the at least two random access preambles includes at least one sequence; or sending one random access preamble before a base station responds to random access, where the one random access preamble includes at least two sequences; and receiving a message of the base station for responding to a successfully detected sequence or a random access preamble that includes a successfully detected sequence.

With this method, a terminal device can send at least two random access preambles before the base station responds to random access, and receive a message of the base station for responding to a successfully detected sequence or a random access preamble that includes a successfully detected sequence.

In some embodiments, the sequence is sequence information or a sequence signal used by the terminal device for random access. When performing random access, the terminal device selects one piece of sequence information or one sequence signal from a specific quantity (for example, 64) of pieces of sequence information or sequence signals as a sequence for the random access, and sends the sequence to the base station.

In an example implementation, the method further includes: receiving the message, for responding to the successfully detected sequence or the random access preamble that includes a successfully detected sequence, sent by the base station through at least two downlink transmissions.

This can avoid a latency resulting from reception by the terminal device a response from another downlink transmit beam when failing to receive a response from one downlink transmit beam, thereby improving efficiency of responding to the terminal device, and reducing a time for the terminal device to receive a response.

In an example implementation, the method further includes: after receiving the message for responding to the successfully detected sequence or the random access preamble that includes a successfully detected sequence, sending a message to the base station, where the message includes information about a random access preamble or a sequence that has been sent by the terminal device but has not yet been responded to.

This enables the base station to respond to only one of a plurality of random access preambles sent by one terminal device or a plurality of sequences included in one random access preamble. This avoids responding to a plurality of random access preambles or sequences of one terminal device, improving responding efficiency, and reducing resource consumption caused by repeated responding.

In an example implementation, the information about the random access preamble or the sequence that is included in the message and that has been sent by the terminal device but has not yet been responded to includes at least one of the following items of information: a sending time, a sending frequency, an index, and a power headroom of the random access preamble or the sequence that has been sent but has not yet been responded to, and a power headroom of the random access preamble or the sequence that has been responded to.

In an example implementation, the method further includes: when the received message carries signal received quality RSRP, obtaining, based on the RSRP and transmit power for sending the random access preambles or the sequences, a path loss corresponding to each transmit beam, and selecting a transmit beam with a small path loss to send a subsequent message. Hence, when the subsequent message is sent, a path loss is small. This can improve quality of subsequent message transmissions.

In some embodiments, after the transmit beam with a small path loss is selected, a time and/or frequency resource indicated by an uplink grant in a random access response corresponding to the transmit beam may be selected to send the subsequent message.

According to still another aspect, an embodiment of the present invention provides a base station, including a receiver, a transmitter, a memory, and a processor, where the memory stores a set of program code, and the processor is configured to invoke the program code stored in the memory, to perform the following operations:

receiving at least two random access preambles before responding to random access of a terminal device, where each of the at least two random access preambles includes at least one sequence; or receiving one random access preamble before responding to random access of a terminal device, where the one random access preamble includes at least two sequences;

checking for the sequences in the received random access preambles; and responding to a successfully detected sequence or a random access preamble that includes a successfully detected sequence.

With this base station, responding to a plurality of successfully detected random access preambles or a plurality of successfully detected sequences included in one random access preamble is implemented.

In some embodiments, the sequence is sequence information or a sequence signal used by the terminal device for random access. When performing random access, the terminal device selects one piece of sequence information or one sequence signal from a specific quantity (for example, 64) of pieces of sequence information or sequence signals as a sequence for the random access, and sends the sequence to the base station.

In an example implementation, the processor is further configured to: when receiving a plurality of random access preambles or a plurality of sequences sent by one terminal device, respond to only one random access preamble or only one sequence.

In an example implementation, the processor is further configured to: respond, through at least two downlink transmissions, to the successfully detected sequence or the random access preamble that includes a successfully detected sequence. This can avoid a latency resulting from reception by the terminal device a response from another downlink transmit beam when failing to receive a response from one downlink transmit beam, thereby improving efficiency of responding to the terminal device, and reducing a time for the terminal device to receive a response.

In an example implementation, the processor is further configured to: receive a message that is sent by the terminal device after the terminal device receives a random access response, where the message includes information about a random access preamble or a sequence that has been sent by the terminal device but has not yet been responded to; and skip responding to a successfully detected random access preamble or sequence that is included in the message and that has been sent by the terminal device but has not yet been responded to.

In this way, for a plurality of random access preambles sent by one terminal device or a plurality of sequences included in one random access preamble, only one of the random access preambles or sequences is responded to. This avoids responding to a plurality of random access preambles or sequences of one terminal device, improving responding efficiency, and reducing resource consumption caused by repeated responding.

In an example implementation, the information about the random access preamble or the sequence that is included in the message and that has been sent by the terminal device but has not yet been responded to includes at least one of the following items of information: a sending time, a sending frequency, an index, and a power headroom of the random access preamble or the sequence that has been sent but has not yet been responded to.

In an example implementation, the processor is further configured to: select, based on a power headroom of a successfully detected random access preamble or sequence that is included in the message, and signal received quality of the successfully detected random access preamble or sequence, a beam for receiving random access sent by the terminal device.

In some embodiments, the base station may further include, in a message sent to the terminal device, a selected time of sending a random access preamble by the terminal device or a time of receiving the random access preamble, to instruct the terminal device to use a transmit beam for sending the random access preamble, to send a subsequent message.

In an example implementation, when at least two base stations each receive a plurality of random access preambles or a plurality of sequences sent by one terminal device, the base station is configured to send, to another base station, a random access preamble or a sequence that has been responded to, or receive a random access preamble or a sequence that is sent by another base station and that has been responded to; and skip responding to the random access preamble or the sequence that has been responded to.

In some embodiments, the at least two base stations exchange messages through a backhaul link.

In an example implementation, when at least two base stations each receive a plurality of random access preambles or a plurality of sequences sent by one terminal device, the base station is configured to send information about a successfully detected random access preamble or sequence to a third-party device, so that the third-party device determines a base station that is to respond to the successfully detected random access preamble or sequence.

The third-party device is a device responsible for resource scheduling, configuration, and/or processing functions between base stations.

In some embodiments, the at least two base stations may send, to the third-party device, received messages that are sent by terminal device after the terminal device receives random access responses, so that the third-party device determines whether to respond to other random access preambles or sequences detected by the base stations. Further, after determining to respond to the other preambles or sequences detected by the base stations, the third-party device may further determine a base station that is to respond to these random access preambles or sequences.

In some embodiments, after receiving random access preambles or sequences sent by a terminal device, the base station may further send a successfully detected random access preamble or sequence to the third-party device, so that the third-party device determines a base station that is to respond to the random access preamble or the sequence. For example, when at least two base stations each receive a plurality of random access preambles or a plurality of sequences sent by one terminal device, the base stations that receive the random access preambles or the sequences sent by the terminal device send a successfully detected random access preamble or sequence to the third-party device, so that the third-party device determines a base station that is to respond to the random access preamble or the sequence.

In an example implementation, a random access preamble response sent by the base station includes at least one of the following pieces of information: an index number corresponding to a random access preamble, signal received quality of the random access preamble, and a time and/or frequency domain location of the random access preamble; or includes at least one of the following pieces of information: an index number of a sequence, signal received quality of the sequence, and a time and/or frequency domain location of the sequence.

In some embodiments, for the time and/or frequency domain location of the random access preamble, a new field may be added into a response message to the random access preamble to record time and/or frequency domain location information of the preamble; or an RA-RNTI may be used to carry time and/or frequency domain location information of the random access preamble.

In an example implementation, the processor determines an order for sending random access preamble responses, based on one of the following pieces of information:

a time order of reception of random access preambles, strengths of detected signals, priority information carried in detected random access preambles, or a quantity of random access preambles detected within one receive beam.

In an example implementation, when two base stations each send a random access preamble that includes at least two sequences, and random access to the two base stations has identical time and frequency locations, the random access preambles received by the two base stations have only one sequence in common.

According to yet another aspect, an embodiment of the present invention provides a terminal device, including a receiver, a transmitter, a memory, and a processor, where the memory stores a set of program code, and the processor is configured to invoke the program code stored in the memory, to perform the following operations:

sending at least two random access preambles before a base station responds to random access, where each of the at least two random access preambles includes at least one sequence; or sending one random access preamble before a base station responds to random access, where the one random access preamble includes at least two sequences; and receiving a message of the base station for responding to a successfully detected sequence or a random access preamble that includes a successfully detected sequence.

The foregoing terminal device can send at least two random access preambles before the base station responds to random access, and receive a message of the base station for responding to a successfully detected sequence or a random access preamble that includes a successfully detected sequence.

In some embodiments, the sequence is sequence information or a sequence signal used by the terminal device for random access. When performing random access, the terminal device selects one piece of sequence information or one sequence signal from a specific quantity (for example, 64) of pieces of sequence information or sequence signals as a sequence for the random access, and sends the sequence to the base station.

In an example implementation, the processor is further configured to: receive the message, for responding to the successfully detected sequence or the random access preamble that includes a successfully detected sequence, sent by the base station through at least two downlink transmissions. This can avoid a latency resulting from reception by the terminal device a response from another downlink transmit beam when failing to receive a response from one downlink transmit beam, thereby improving efficiency of responding to the terminal device, and reducing a time for the terminal device to receive a response.

In an example implementation, the processor is further configured to: after receiving the message for responding to the successfully detected sequence or the random access preamble that includes a successfully detected sequence, send a message to the base station, where the message includes information about a random access preamble or a sequence that has been sent by the terminal device but has not yet been responded to. This enables the base station to respond to only one of a plurality of random access preambles sent by one terminal device or a plurality of sequences included in one random access preamble. This avoids responding to a plurality of random access preambles or sequences of one terminal device, improving responding efficiency, and reducing resource consumption caused by repeated responding.

In an example implementation, the processor is further configured to: the information about the random access preamble or the sequence that is included in the message and that has been sent by the terminal device but has not yet been responded to includes at least one of the following items of information: a sending time, a sending frequency, an index, and a power headroom of the random access preamble or the sequence that has been sent but has not yet been responded to, and a power headroom of the random access preamble or the sequence that has been responded to.

In an example implementation, the processor is further configured to: when the received message carries signal received quality RSRP, obtain, based on the RSRP and transmit power for sending the random access preambles or the sequences, a path loss corresponding to each transmit beam, and select a transmit beam with a small path loss to send a subsequent message.

In some embodiments, after selecting the transmit beam with a small path loss, the processor may further select a time and/or frequency resource indicated by an uplink grant in a random access response corresponding to the transmit beam, to send the subsequent message.

An embodiment of this application further provides a program. When executed by a processor, the program is used to perform the foregoing random access responding method.

An embodiment of this application further provides a program product, for example, a computer-readable storage medium, including the foregoing program.

An embodiment of this application further provides a computer-readable storage medium. The computer-readable storage medium stores an instruction. When the instruction is run on a computer, the computer is enabled to perform the foregoing random access responding method.

An embodiment of this application further provides a program. When executed by a processor, the program is used to perform the foregoing random access method.

An embodiment of this application further provides a program product, for example, a computer-readable storage medium, including the foregoing program.

An embodiment of this application further provides a computer-readable storage medium. The computer-readable storage medium stores an instruction. When the instruction is run on a computer, the computer is enabled to perform the foregoing random access method.

DESCRIPTION OF DRAWINGS

To describe the technical solutions in embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes embodiments of the present invention with reference to the accompanying drawings.

In addition, terms "first" and "second" in the embodiments of the present invention are merely intended for a purpose of description, and shall not be understood as an indication or implication of relative importance or implicit indication of a quantity of indicated technical features. Therefore, a feature modified by "first" or "second" may explicitly or implicitly include one or more same features.

Figure 1:
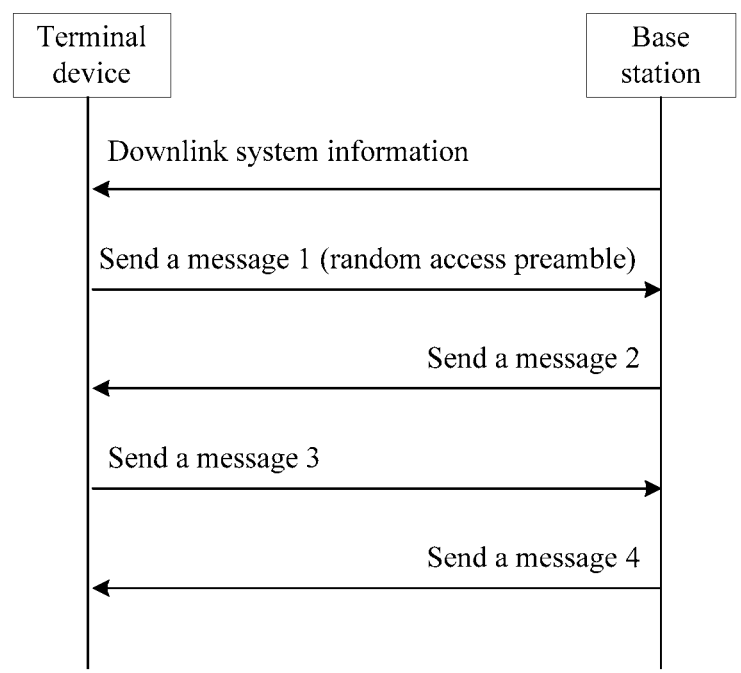
FIG. 1 is a schematic diagram of a random access process relating to the embodiments of the present invention.

FIG. 1 is a schematic diagram of a random access process relating to the embodiments of the present invention. The random access process is applied to random access between a base station and a terminal device. A communications system including the base station and the terminal device in FIG. 1 may be a global system for mobile communications (Global System for Mobile Communication, GSM), a code division multiple access (Code Division Multiple Access, CDMA) system, a wideband code division multiple access (Wideband Code Division Multiple Access, WCDMA) system, a worldwide interoperability for microwave access (Worldwide Interoperability for Microwave Access, WiMAX) system, a long term evolution (long term evolution, LTE) system, a 5G communications system (for example, a new radio (new radio, NR) system), a communications system integrating a plurality of communications technologies (for example, a communications system integrating an LTE technology and an NR technology), or a future evolved communications system.

The terminal device herein is a device with a wireless communication function, and may be, for example, a handheld device, an in-vehicle device, a wearable device, or a computing device that is provided with a wireless communication function, or other processing devices connected to a wireless modem. In different networks, the terminal device may have different names, for example, user equipment, an access terminal, a subscriber unit, a subscriber station, a mobile station, a mobile console, a remote station, a remote terminal, a mobile device, a user terminal, a terminal, a wireless communications device, a user agent, a user apparatus, a cellular phone, a cordless phone, a session initiation protocol (Session Initiation Protocol, SIP) phone, a wireless local loop (Wireless Local Loop, WLL) station, a personal digital assistant (Personal Digital Assistant, PDA), or a terminal device in a 5G network or a future evolved network.

The base station in this application may also be referred to as a base station device, which is a device deployed in a radio access network and configured to provide a wireless communication function, including but not limited to a base station (for example, a BTS (Base Transceiver Station, BTS), a NodeB (NodeB, NB), an evolved NodeB (Evolutional Node B, eNB or eNodeB), a transmission point or a transmission reception point (transmission reception point, TRP or TP) in an NR system, a next generation NodeB (generation nodeB, gNB), or a base station or a network device in a future communications network), a relay node, an access point, an in-vehicle device, a wearable device, a wireless fidelity (Wireless-Fidelity, Wi-Fi) station, a wireless backhaul node, a small cell, and a micro base station.

The following uses a process of implementing random access of a terminal device to a base station in an LTE system as an example for description.

As shown in FIG. 1, when performing random access, the terminal device first receives downlink system information (System information block-2, SIB2) sent by the base station, and obtains a random access configuration parameter, including but not limited to a time for receiving a random access response (RAR) by the terminal device. The terminal device generates a random access preamble (that is, a message 1) based on the obtained configuration parameter, and sends the random access preamble. The random access preamble includes a sequence, and the sequence is used to distinguish the terminal device from other terminal devices in random access. Generally, the configuration parameter in the downlink system information sent by the base station specifies a random access preamble format to be used. The terminal device generates the random access preamble in the format specified by the base station. It should be noted that a plurality of random access preamble formats are defined in the LTE system. Random access preambles in different formats have different time lengths.

The base station checks a received signal, and if detecting a random access preamble or a sequence in a random access preamble, generates a corresponding RAR, that is, a message 2. As shown in FIG. 1, after detecting a random access preamble sent by the terminal device, the base station generates a random access response message, and sends the random access response message to the terminal device. The random access response includes but is not limited to an index, a timing advance (TA), and an uplink grant (Uplink grant) that are corresponding to the random access preamble. The TA is a channel latency estimated by the base station based on the random access sequence.

After receiving the random access response sent by the base station, the terminal device generates a message 3, and sends the message 3 to the base station. The message 3 includes but is not limited to a common control channel (CCCH) message, or a cell radio network temporary identifier (C-RNTI).

After successfully receiving the message 3, the base station sends a message 4 to the terminal device. The message 4 includes a CCCH message. The CCCH message is used to assist in resolving a conflict between a plurality of terminal devices using a same sequence at the same time.

In the foregoing process, if the terminal device fails to receive, within the RAR receiving time, the RAR sent by the base station, the terminal device sends another random access preamble. That is, the terminal device sends a random access preamble only once within the RAR receiving time specified by the base station. The RAR receiving time of the terminal device is a period of time within which the terminal device attempts to receive an RAR after sending a random access preamble. If the corresponding RAR is received within the period of time, the terminal device stops RAR reception, and sends the message 3 on time and frequency resources specified by the RAR. If the corresponding RAR is not received within the period of time, the terminal device fails the random access, and needs to send a random access preamble again.

In this manner in which the terminal device sends only one random access preamble before receiving an RAR, a time occupied by random access is excessively long. This cannot meet a requirement of future communications in a multibeam network. If the terminal device sends, before receiving an RAR, a plurality of random access preambles or one random access preamble including a plurality of sequences, the time for random access can be reduced, thereby improving random access efficiency. An implementation in which the base station receives, before sending an RAR, a plurality of random access preambles or one random access preamble including a plurality of sequences includes but is not limited to: the base station receives the plurality of sequences in the one random access preamble by using different receive beams; the plurality of random access preambles are sent by using different transmit beams, the base station receives the plurality of random access preambles by using one receive beam, and each random access preamble is sent and received within one transmit-receive beam pair; or the plurality of random access preambles are sent by using one transmit beam or different transmit beams, the base station receives the plurality of random access preambles by using different receive beams, and each random access preamble is sent and received within a plurality of transmit-receive beam pairs.

In this way, when the base station receives one or more random access preambles, it is likely that a plurality of random access preambles are successfully detected, or a plurality of sequences included in one random access preamble are successfully detected. For the plurality of successfully detected random access preambles or the plurality of successfully detected sequences included in one random access preamble, the base station needs an effective responding mechanism to respond to the plurality of random access preambles that are successfully received before an RAR is sent, or the plurality of sequences included in one random access preamble that is successfully received before an RAR is sent.

The following uses implementation of random access of a terminal device to a base station as an example, to describe random access preamble responding manners of the base station in different scenarios when a plurality of random access preambles are sent or one sent random access preamble includes a plurality of sequences before the base station sends an RAR or before the terminal device receives an RAR. It should be noted that, to clearly describe the technical solutions provided in the embodiments of this application, in the following descriptions, a preamble is a random access preamble and a sequence is a sequence in a random access preamble.

Scenario 1: The terminal device performs two random access preamble transmissions, with one random access preamble sent at each time. In time, the two transmissions may be contiguous or separated from each other. That is, the base station receives the two random access preambles before responding to the received preambles. The two sent random access preambles may be identical or different. In some embodiments, the terminal device may use one transmit beam to send the random access preambles within one receive beam of the base station, or the terminal device may use one transmit beam to send the random access preambles within different receive beams of the base station, or may use different transmit beams to send the random access preambles within one receive beam of the base station, or may use different transmit beams to send the random access preambles within different receive beams of the base station.

Figure 2A:
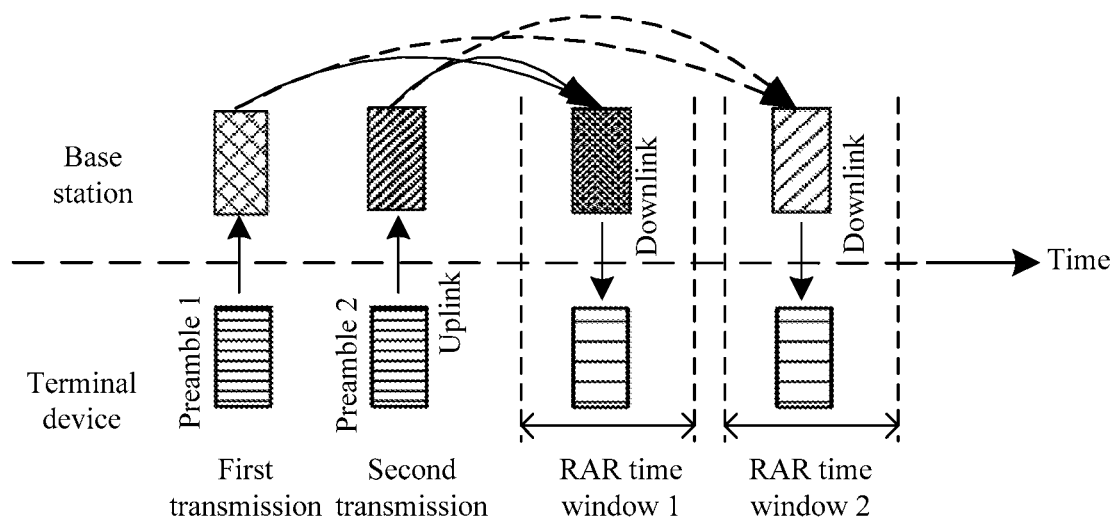
FIG. 2(a) is a schematic diagram of an implementation of responding by a base station to a plurality of random access preambles sent by a terminal device, according an embodiment of the present invention.
Figure 2B:
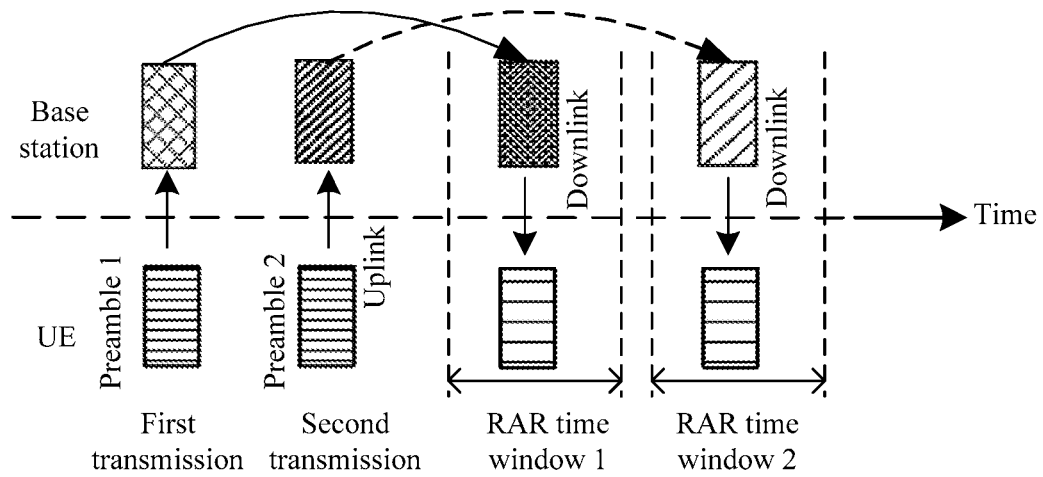
FIG. 2(b) is a schematic diagram of another implementation of responding by a base station to a plurality of random access preambles sent by a terminal device, according an embodiment of the present invention.
Figure 2C:
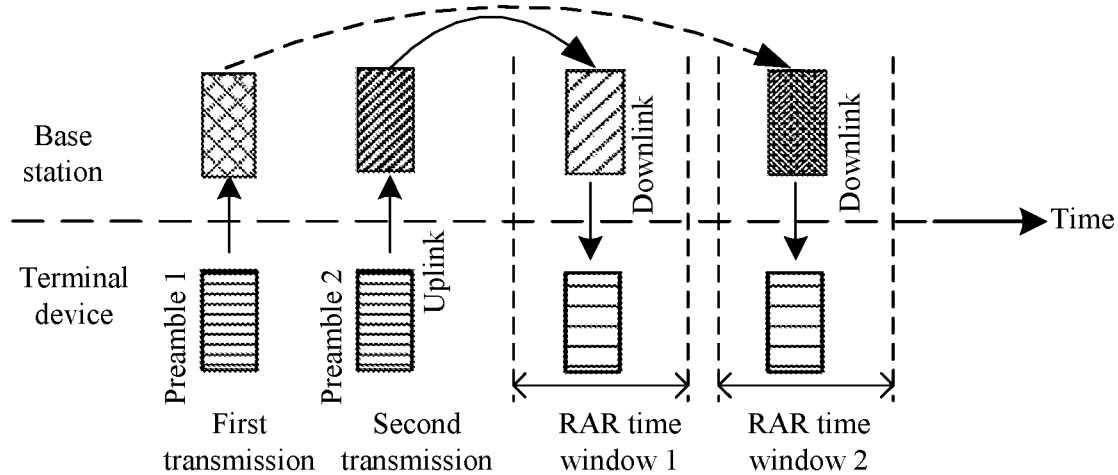
FIG. 2(c) is a schematic diagram of still another implementation of responding by a base station to a plurality of random access preambles sent by a terminal device, according an embodiment of the present invention.

In this scenario, a manner in which the base station responds to the random access preambles sent by the terminal device may be implemented by using implementations in FIG. 2(a), FIG. 2(b), and FIG. 2(c).

As shown in FIG. 2(a), an order of time is represented from left to right, and different rectangular blocks represent different beams. For example, if a base station uses different receive beams or different transmit beams, rectangular blocks representing beams used by the base station are different. If a terminal device uses one transmit beam to send random access preambles, rectangular blocks representing transmit beams used by the terminal device are identical. If a terminal device uses one receive beam to receive responses sent by a base station, rectangular blocks representing receive beams used by the terminal device are identical. Because the transmit beam and the receive beam used by the terminal device are different, the rectangular blocks representing transmit beams used by the terminal device and the rectangular blocks representing receive beams used by the terminal device are different. In addition, in FIG. 2(a), the terminal device sends a preamble 1 in the first transmission, and sends a preamble 2 in the second transmission. Structures of FIG. 2(b) and FIG. 2(c) and meanings represented by drawing elements therein are similar to those in FIG. 2(a), and details are not further described again.

In FIG. 2(a), if the base station successfully detects the preamble 1 and the preamble 2 sent by the terminal device, the base station responds to the preamble 1 and the preamble 2 in one transmit beam or separately in at least two downlink transmit beams. FIG. 2(a) uses an example in which the preamble 1 and the preamble 2 sent by the terminal device are responded to by using two different downlink transmit beams, for illustration. That the base station use two or more downlink transmit beams to respond to preambles sent by the terminal device can avoid a latency resulting from reception by the terminal device a response from another downlink transmit beam when failing to receive a response from one downlink transmit beam, thereby improving efficiency of responding to the terminal device, and reducing a time for the terminal device to receive a response. It should be noted that, in this embodiment of this application, the downlink transmit beam is a transmit beam used by the base station to send a message or a response to the terminal device.

In some embodiments, the base station may include at least one of the following pieces of information in a random access response to the preamble 1 or the preamble 2: an index number corresponding to the preamble, signal received quality (Reference signals received power, RSRP) of the preamble, and time and/or frequency domain location information of the preamble. For the time and/or frequency domain location information of the preamble, a new field may be added into the response message to the preamble to record the time and/or frequency domain location information of the preamble; or a random access-radio network temporary identifier (Random access-radio network temporary identifier, RA-RNTI) may be used to carry the time and/or frequency domain location information of the random access preamble.

If the random access response of the base station carries the RSRP, the terminal device may obtain, based on transmit power for sending preambles and RSRP carried in RARs, a path loss corresponding to each transmit beam. For example, the terminal device may calculate path losses based on transmit power for sending preambles and RSRP carried in RARs to the preambles. After obtaining the path losses, the terminal device may select a transmit beam with a small path loss to send a subsequent message. For example, a transmit beam of a small path loss is selected to send a message 3 or another subsequent message. Further, the terminal device may further select a time and/or frequency resource indicated by an uplink grant in an RAR corresponding to the transmit beam, to send the subsequent message, including but not limited to the message 3. Before sending each preamble, the terminal device determines power for sending the preamble. The terminal device can obtain the transmit power for each preamble. In addition, the terminal device may receive a plurality of RARs, and may obtain, based on identifiers in the RARs, an RAR to a preamble sent by the terminal device itself, and obtain a path loss based on RSRP in the obtained RAR and power for sending the preamble.

An implementation shown in FIG. 2(b) is different from that shown in FIG. 2(a) in that, if a base station successfully detects a preamble 1 and a preamble 2, the base station responds in corresponding downlink transmit beams. In terms of time, two responding operations are performed in a time order in which a terminal device sends the preambles and the base station receives the preambles. There is a specific association relationship between a receive beam used by the base station to receive a random access preamble and a transmit beam used by the base station to send a response to the random access preamble. For example, the receive beam and the transmit beam are roughly the same in terms of direction. In this embodiment of this application, a transmit beam that has an association relationship with a receive beam is referred to as a downlink transmit beam corresponding to the receive beam.

An implementation shown in FIG. 2(c) is different from that shown in FIG. 2(b) in that, if a base station successfully detects a preamble 1 and a preamble 2, the base station responds in corresponding downlink transmit beams. A time order of two responding operations is determined by the base station. The order that the base station selects to respond to the preamble 1 and the preamble 2 may be implemented in the following manners: determining the order for responding to the preamble 1 and the preamble 2 based on strengths of detected signals, for example, first responding to a preamble with a greater signal strength; determining the order for responding to the preamble 1 and the preamble 2 based on information (including but not limited to information such as priorities) carried in detected preambles, for example, responding in order of priority; or determining the order for responding to the preamble 1 and the preamble 2 based on quantities of preambles detected within receive beams, for example, first responding to a preamble in a receive beam with a largest quantity of preambles detected.

In some embodiments, in FIG. 2(a), the base station may alternatively respond to the preambles by using corresponding downlink transmit beams. In FIG. 2(b) and FIG. 2(c), the base station may alternatively respond to the preambles by using one or at least two downlink transmit beams.

In this embodiment, a time within which the base station responds to a random access preamble of the terminal device may also be referred to as an RAR time window. In the implementations in FIG. 2(a), FIG. 2(b), and FIG. 2(c), RAR time windows of receive beams of the base station may not overlap at all, or may partially overlap, or may be exactly the same. If RAR time windows corresponding to two receive beams partially overlap, the RAR time windows may be distinguished by using content (for example, time locations and/or frequency domain locations) of RARs or radio network temporary identifiers (radio network temporary identifier, RNTI) corresponding to RARs.

In another embodiment, a plurality of random access preambles to be sent by the terminal device are specified by the base station in advance, or the base station has already learned about a plurality of preambles that may be sent by the terminal device. In this case, the base station responds to only one of a plurality of detected preambles.

Scenario 2: The terminal device sends one random access preamble that includes at least two sequences. That is, a preamble received before the base station responds to any preamble includes at least two sequences. In time, the at least two sequences may be contiguous or separated from each other. The at least two sequences may be identical or different. The terminal device may use one transmit beam to send the random access preamble within one receive beam of the base station, or the terminal device may use one transmit beam to send the random access preamble within different receive beams of the base station, or may use different transmit beams to send the random access preamble within one receive beam of the base station, or may use different transmit beams to send the random access preamble within different receive beams of the base station.

Figure 3A:
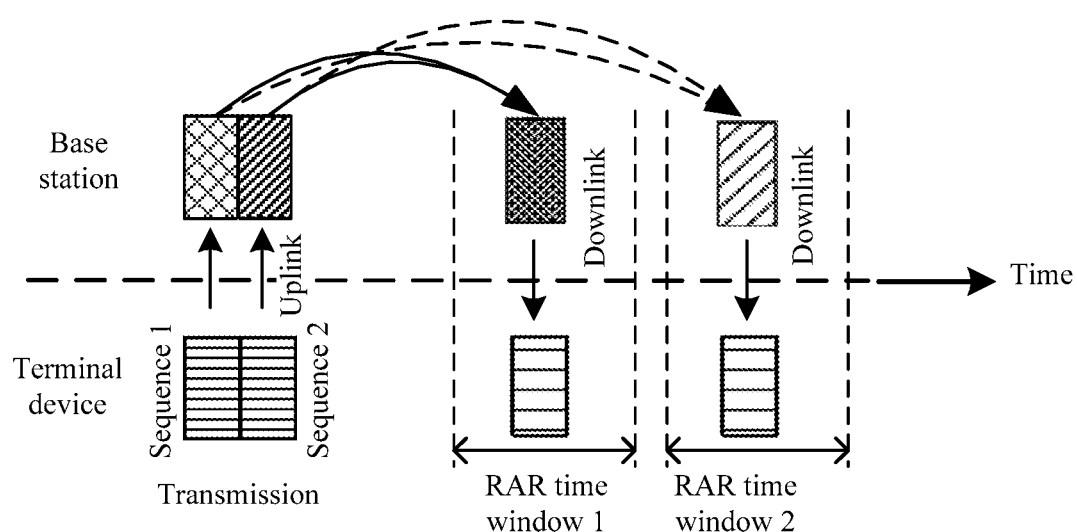
FIG. 3(a) is a schematic diagram of an implementation of responding by a base station to a plurality of sequences included in a random access preamble sent by a terminal device, according an embodiment of the present invention.

As shown in FIG. 3(a), an order of time is represented from left to right, and different rectangular blocks represent different beams. For example, if a base station uses different receive beams or different transmit beams, rectangular blocks representing beams used by the base station are different. If a terminal device uses one transmit beam to send a random access preamble, rectangular blocks representing transmit beams used by the terminal device are identical. If a terminal device uses one receive beam to receive responses sent by a base station, rectangular blocks representing receive beams used by the terminal device are identical. Because the transmit beam and the receive beam used by the terminal device are different, the rectangular blocks representing transmit beams used by the terminal device and the rectangular blocks representing receive beams used by the terminal device are different. The terminal device sends a sequence 1 and a sequence 2. Structures of FIG. 3(b) and FIG. 3(c) and meanings represented by drawing elements therein are similar to those in FIG. 3(a), and details are not further described again.

In FIG. 3(a), if the base station successfully detects the sequence 1 and the sequence 2 that are sent by the terminal device, the base station responds, in each downlink transmit beam, with index numbers corresponding to the sequences. FIG. 3(a) uses an example in which the preamble 1 and the preamble 2 sent by the terminal device are responded to by using two different downlink transmit beams, for illustration. To each sequence, the base station may respond by using two or more downlink transmit beams. That the base station uses two or more downlink transmit beams to respond to each sequence in the preamble sent by the terminal device can avoid a latency resulting from reception by the terminal device a response from another downlink transmit beam when failing to receive a response from one downlink transmit beam, thereby improving response receiving efficiency of the terminal device, and reducing a time for the terminal device to receive a response.

Figure 3B:
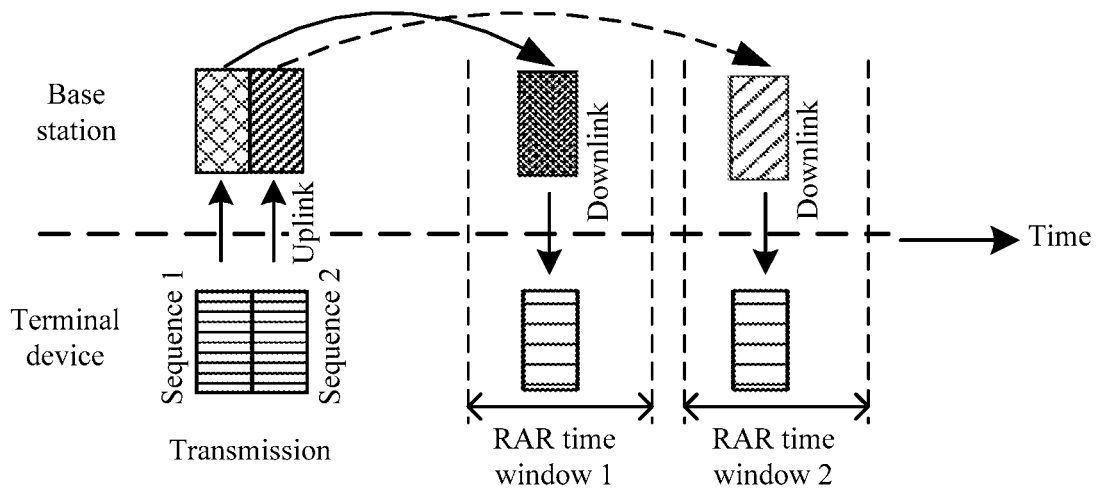
FIG. 3(b) is a schematic diagram of another implementation of responding by a base station to a plurality of sequences included in a random access preamble sent by a terminal device, according an embodiment of the present invention.

In some embodiments, the base station may include at least one of the following pieces of information in a random access response to the sequence 1 or the sequence 2: an index number of the sequence, RSRP of the sequence, time and/or frequency domain location information of the preamble carrying the sequence, and time and/or frequency domain location information of the sequence. For the time and/or frequency domain location information of the preamble carrying the sequence and the time and/or frequency domain location information of the sequence, a new field may be added into the response message to the sequence to record the time and/or frequency domain location information of the preamble carrying the sequence and the time and/or frequency domain location information of the sequence; or an RA-RNTI may be used to carry the time and/or frequency domain location information of the preamble carrying the sequence and the time and/or frequency domain location information of the sequence An implementation shown in FIG. 3(b) is different from that shown in FIG. 3(a) in that, if a base station successfully detects a sequence 1 and a sequence 2, the base station responds in corresponding downlink transmit beams. In time, two responding operations are performed based on an order in which a terminal device sends the sequences and the base station receives the sequences. There is a specific association relationship between a receive beam used by the base station to receive a sequence in the random access preamble and a transmit beam used by the base station to send a response to the sequence in the random access preamble. For example, the receive beam and the transmit beam are roughly the same in terms of direction. In this embodiment of this application, a transmit beam that has an association relationship with a receive beam is referred to as a downlink transmit beam corresponding to the receive beam.

Figure 3C:
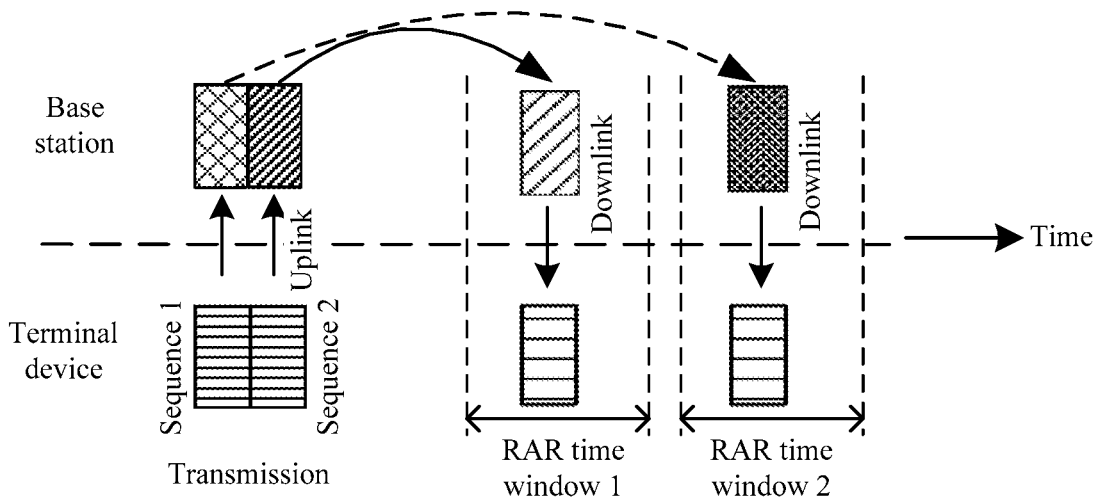
FIG. 3(c) is a schematic diagram of still another implementation of responding by a base station to a plurality of sequences included in a random access preamble sent by a terminal device, according an embodiment of the present invention.

An implementation shown in FIG. 3(c) is different from that shown in FIG. 3(b) in that, if a base station successfully detects a sequence 1 and a sequence 2, the base station responds in corresponding downlink transmit beams. A time order of two responding operations is determined by the base station. The order that the base station selects to respond to the sequence 1 and the sequence 2 may be implemented in the following manners: determining the order for responding to the sequence 1 and the sequence 2 based on strengths of detected signals, for example, first responding to a sequence with a greater signal strength; determining the order for responding to the preamble 1 and the preamble 2 based on information (including but not limited to information such as priorities) carried in detected preambles; or determining the order for responding to the sequence 1 and the sequence 2 based on quantities of preambles detected within receive beams.

In some embodiments, in FIG. 3(*a*), the base station may alternatively respond to the sequences by using corresponding downlink transmit beams. In FIG. 3(*b*) and FIG. 3(*c*), the base station may alternatively respond to the sequences by using one or at least two downlink transmit beams.

In the implementations in FIG. 3(*a*), FIG. 3(*b*), and FIG. 3(*c*), RAR time windows of receive beams of the base station may not overlap at all, or may partially overlap, or may be exactly the same. If RAR time windows corresponding to two receive beams partially overlap, the RAR time windows may be distinguished by using content (for example, time locations and/or frequency domain locations) of RARs or radio network temporary identifiers (RNTI) corresponding to RARs.

In another embodiment, sequences included in a random access preamble sent by the terminal device are specified by the base station in advance, or the base station has already learned about composition of a preamble that may be sent by the terminal device. In this case, the base station responds to only one of a plurality of detected sequences in the preamble.

Scenario 3: Two terminal devices, for example, a terminal device 1 and a terminal device 2, each send preambles. For example, before the base station responds to any preamble, the terminal device 1 sends two preambles, for example, a preamble 1 and a preamble 2, and the terminal device 2 also sends two preambles, for example, a preamble 3 and a preamble 4. In time, the preamble 1 and the preamble 2 may be contiguous or separated from each other. In time, the preamble 3 and the preamble 4 may be contiguous or separated from each other. The two random access preambles sent by each terminal device may be identical or different. To be specific, the preamble 1 and the preamble 2 may be identical or different, and the preamble 3 and the preamble 4 may be identical or different. Each terminal device may use one transmit beam to send the random access preambles within different receive beams of the base station, or may use different transmit beams to send the random access preambles within one receive beam of the base station, or may use different transmit beams to send the random access preambles within different receive beams of the base station, or may use one transmit beam to send the random access preambles within one receive beam of the base station.

Figure 4A:
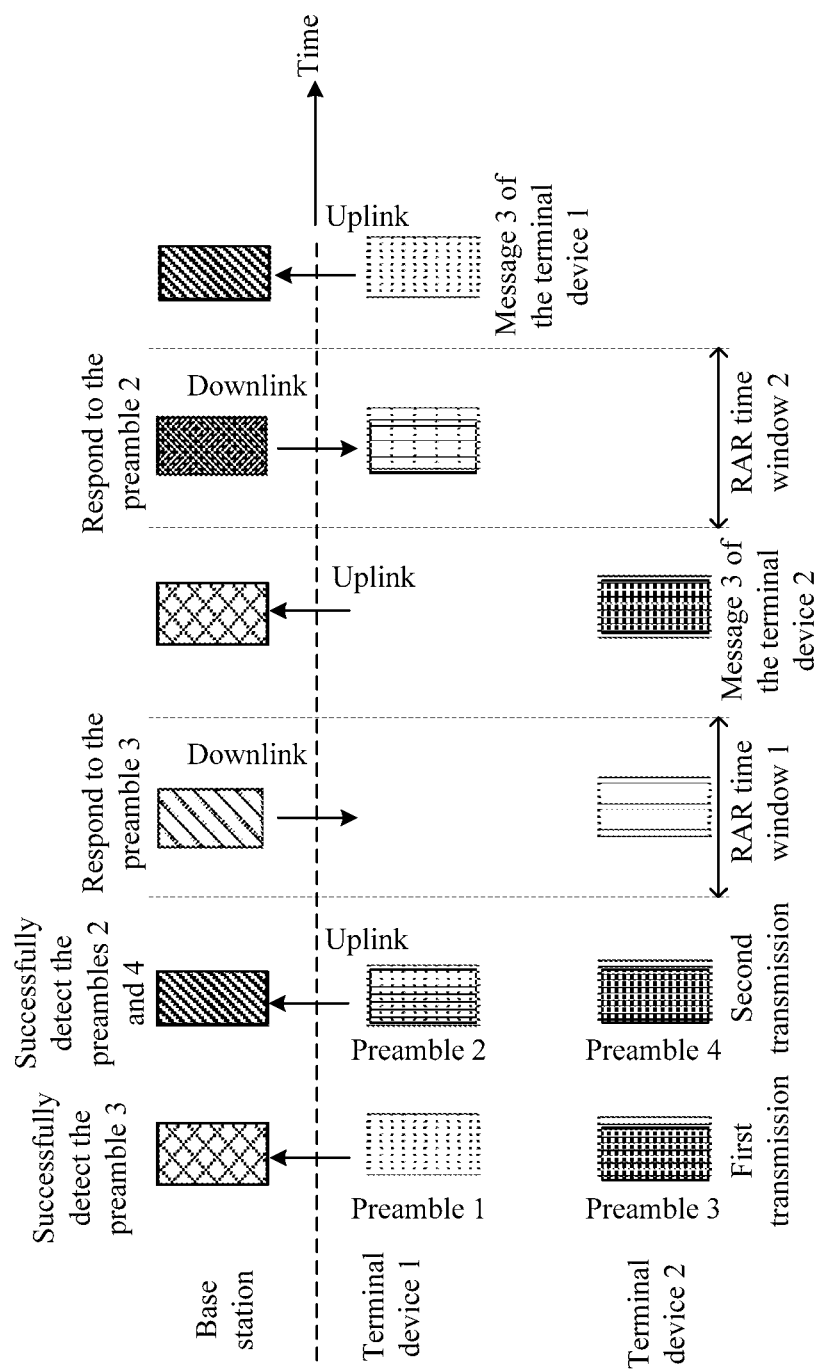
FIG. 4(a) is a schematic diagram of an implementation of responding by a base station to a plurality of random access preambles sent by each of two terminal devices, according an embodiment of the present invention.
Figure 4B:
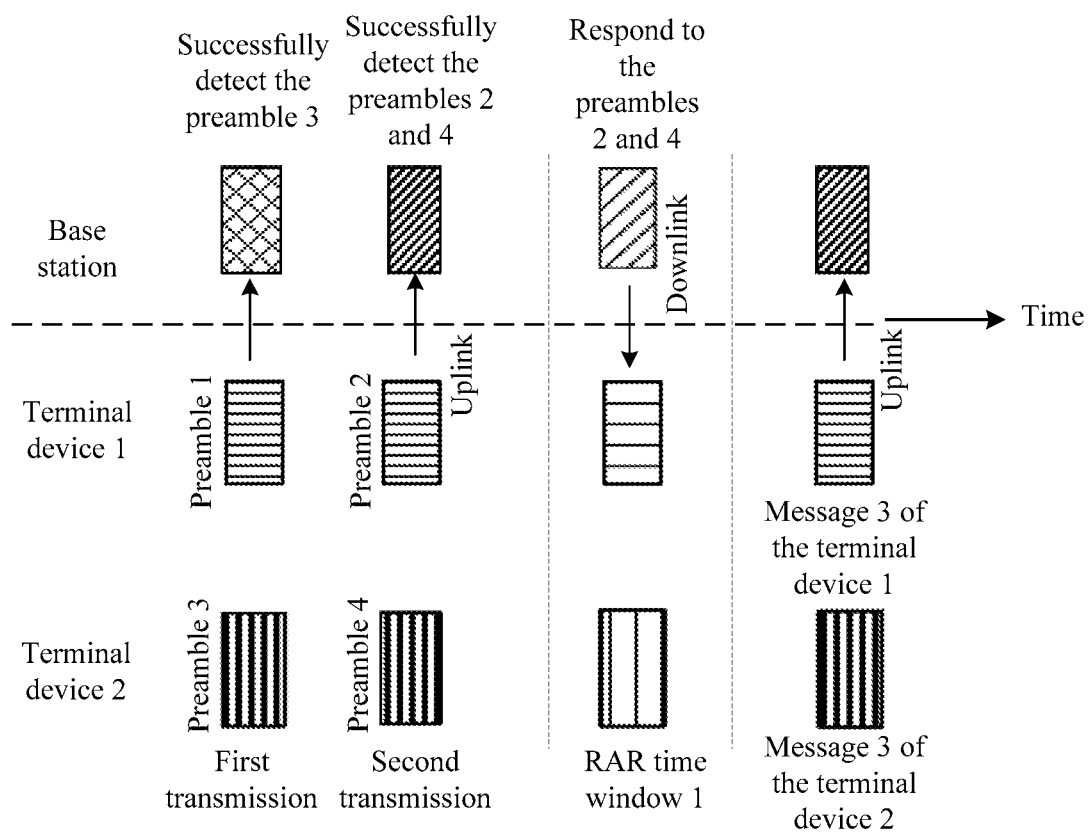
FIG. 4(b) is a schematic diagram of another implementation of responding by a base station to a plurality of random access preambles sent by each of two terminal devices, according an embodiment of the present invention.

The following uses an example in which the base station successfully detects the preamble 2 sent by the terminal device 1, and the preamble 3 and the preamble 4 that are sent by the terminal device 2, to describe a manner in which a base station responds to random access preambles sent by terminal devices. For example, in FIG. 4(*a*) and FIG. 4(*b*), for preambles sent by the terminal device 1 and the terminal device 2 in the first transmission, the base station successfully detects the preamble 3; and for preambles sent by the terminal device 1 and the terminal device 2 in the second transmission, the base station successfully detects the preamble 2 and the preamble 4. As shown in FIG. 4(*a*) and FIG. 4(*b*), an order of time is represented from left to right, and different rectangular blocks represent different beams.

In FIG. 4(*a*), the base station first responds to the successfully detected preamble 3 in the preambles sent by the terminal device 2 in the first transmission. After successfully receiving, within a corresponding RAR receiving time, a response corresponding to the preamble 3, the terminal device 2 sends a message 3 on time and frequency resources indicated by an uplink grant included in the response. The resource indicated by the uplink grant may be a time-frequency resource that the base station instructs the terminal device 2 to use to send the message 3. The message 3 of the terminal device 2 includes information about a preamble that has been sent by the terminal device 2 but has not yet been responded to. The information includes but is not limited to at least one of a sending time, a sending frequency, an index, and a power headroom (power headroom) of the preamble not yet responded to, for example, at least one of a sending time, a sending frequency, an index, and a power headroom of the preamble 4. After receiving the message 3 of the terminal device 2, the base station determines, based on the information in the message 3, that the detected preamble 4 and preamble 3 are sent by one terminal device, and that the terminal device has been responded to. In this case, the base station responds only to the successfully detected preamble 2 in a response to the preambles sent by the terminal devices in the second transmission.

In some embodiments, the message 3 sent by the terminal device 2 to the base station may further include a power headroom of the preamble 3. Hence, after receiving the message 3 sent by the terminal device 2, the base station selects, based on the power headroom of the preamble 3 and the power headroom of the preamble 4 in combination with signal quality of the successfully detected preamble 3 and preamble 4, a receive beam with a small path loss as a receive beam for receiving a message sent by the terminal device 2.

In some embodiments, if the base station fails to receive the message 3 sent by the terminal device 2, the base station may further send an RAR to the preamble 3 again in another downlink transmit beam.

In some embodiments, the response of the base station to the preamble 3 may be sent by using a plurality of downlink transmit beams.

After finishing responding to the preamble 3, the base station responds only to the preamble 2 in a next response.

In FIG. 4(*b*), the base station first responds to the successfully detected preamble 2 and preamble 4 in the preambles sent by the terminal devices in the second transmission. After successfully receiving, within a corresponding RAR receiving time, a response of the base station to the preamble 4, the terminal device 2 sends a message 3 on a resource indicated by an uplink grant included in the response sent by the base station. The sent message 3 includes information about the preamble 3 that has been sent by the terminal device 2 but has not yet been responded to. The information includes but is not limited to at least one of a sending time, a sending frequency, an index, and a power headroom of the preamble 3 not yet responded to. Hence, the base station can learn, based on the information about the preamble 3 carried in the message 3, that the preamble 3 and the preamble 4 are preambles sent by one terminal device (the terminal device 2), and does not need to respond to the preamble 3. Similarly, after successfully receiving, within a corresponding RAR receiving time, a response of the base station to the preamble 2, the terminal device 1 sends a message 3 on a resource indicated by an uplink grant included in the response sent by the base station. The sent message 3 includes information about the preamble 1 that has been sent by the terminal device 1 but has not yet been responded to. Herein, because the base station has not detected the preamble 1, the preamble 1 does not need to be responded to, that is, an RAR to the preamble 1 does not need to be sent. In some embodiments, the message 3 sent by the terminal device 2 may further include a power headroom of the preamble 4. Hence, the base station may select, based on the power headroom of the preamble 3 and the power headroom of the preamble 4 in combination with signal quality of the successfully detected preambles, a receive beam for receiving a message sent by the terminal device 2. Because the base station has not detected the preamble 1 and has not detected signal quality of the preamble 1, there is no need to change a receive beam.

In some embodiments, if the base station fails to receive the message 3 sent by the terminal device 1, the base station may further send an RAR to the preamble 2 again in another downlink transmit beam. Alternatively, if the base station fails to receive the message 3 sent by the terminal device 2, the base station may further send an RAR to the preamble 4 again in another downlink transmit beam.

In some embodiments, the response of the base station to the preamble 2 may be sent by using a plurality of downlink transmit beams, and the response of the base station to the preamble 4 may also be sent by using a plurality of downlink transmit beams.

In another embodiment, the base station may determine, based on strengths of detected signals or a time order of reception of preambles, an order for responding to the preambles; or determine, based on information (including but not limited to information such as priorities, quantities of preambles detected within receive beams, or schedulable resources within beams) carried by detected preambles, whether to first respond to some or all detected preambles.

Figure 4C:
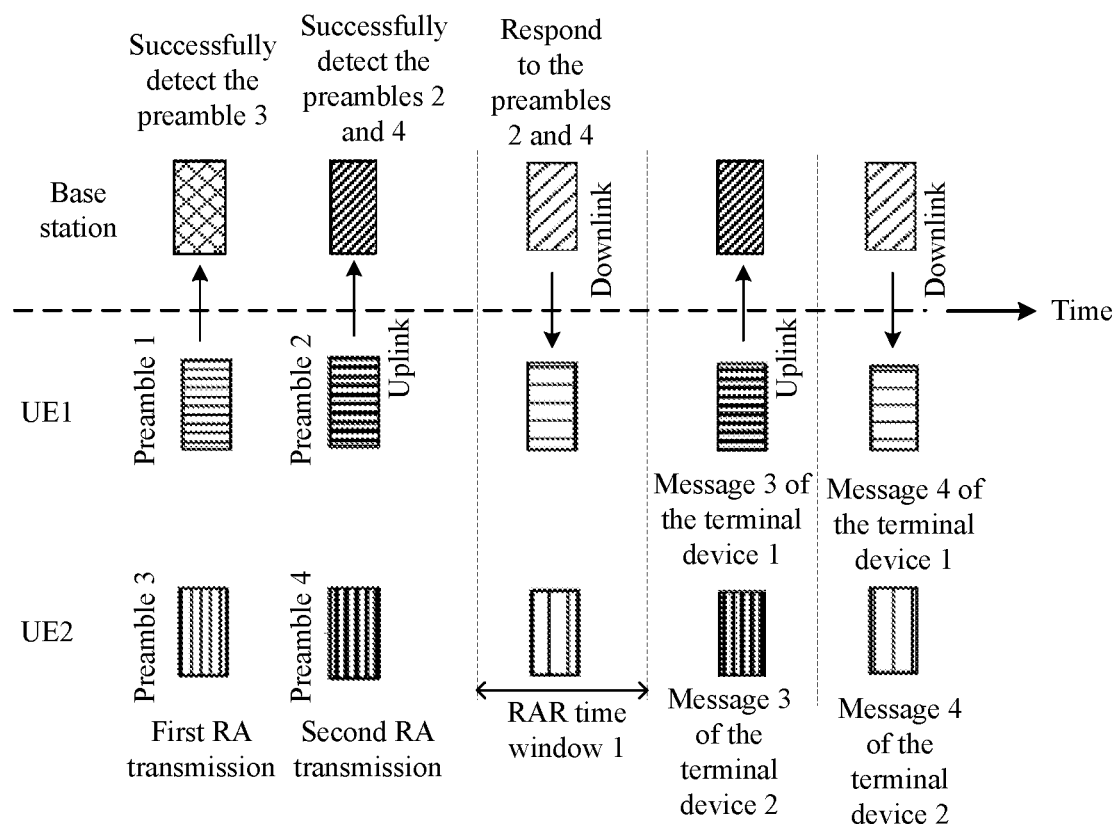
FIG. 4(c) is a schematic diagram of still another implementation of responding by a base station to a plurality of random access preambles sent by each of two terminal devices, according an embodiment of the present invention.

When a terminal device uses different transmit beams to send random access preambles within one receive beam of a base station, as shown in FIG. 4 (c), the method provided in this embodiment of this application may further include: a message 3 sent by the terminal device 1 to the base station includes at least one of the following pieces of information about the preamble 1 and the preamble 2: a sending time, a sending frequency, an index, a power headroom, and the like; a message 3 sent by the terminal device 2 to the base station includes at least one of the following pieces of information about the preamble 3 and the preamble 4: a sending time, a sending frequency, an index, a power headroom, and the like. After receiving the messages 3 of the two terminal devices, the base station selects, based on a power headroom of each preamble and signal received quality of each detected preamble, transmit beams used by the terminal devices to send preambles to the base station. The base station may instruct, in downlink messages 4, the terminal devices to send subsequent messages by using the selected transmit beams. For example, in FIG. 4(c), the base station may instruct the terminal device 2 to reselect a transmit beam that is used to send the preamble 3 by the terminal device 2. The instruction of the base station may be implemented by including, in a message 4, a time of sending the preamble 3 or a time of receiving the preamble 3, to instruct the terminal device 2 to send a subsequent message by using the transmit beam for sending the preamble 3.

In another embodiment, the base station may determine, based on strengths of detected signals or an order of reception of preambles, an order for responding to the preamble 1 and the preamble 2; or determine, based on information (including but not limited to information such as priorities, or quantities of preambles detected within receive beams, or schedulable resources within beams) carried by detected preambles, whether to first respond to some or all detected preambles.

Scenario 4: Two terminal devices, for example, a terminal device 1 and a terminal device 2, each send one preamble, with each preamble including at least two sequences. For example, before the base station responds to any preamble, a preamble sent by the terminal device 1 includes a sequence 1 and a sequence 2, and in time, the sequence 1 and the sequence 2 may be contiguous or separated from each other; and a preamble sent by the terminal device 2 includes a sequence 3 and a sequence 4, and in time, the sequence 3 and the sequence 4 may be contiguous or separated from each other. The sequences sent by each terminal device may be identical or different. To be specific, the sequence 1 and the sequence 2 may be identical or different, and the sequence 3 and the sequence 4 may be identical or different. Each terminal device may use one transmit beam to send the random access preambles within one receive beam of the base station, or may use one transmit beam to send the random access preambles within different receive beams of the base station, or may use different transmit beams to send the random access preambles within one receive beam of the base station, or may use different transmit beams to send the random access preambles within different receive beams of the base station.

Figure 5A:
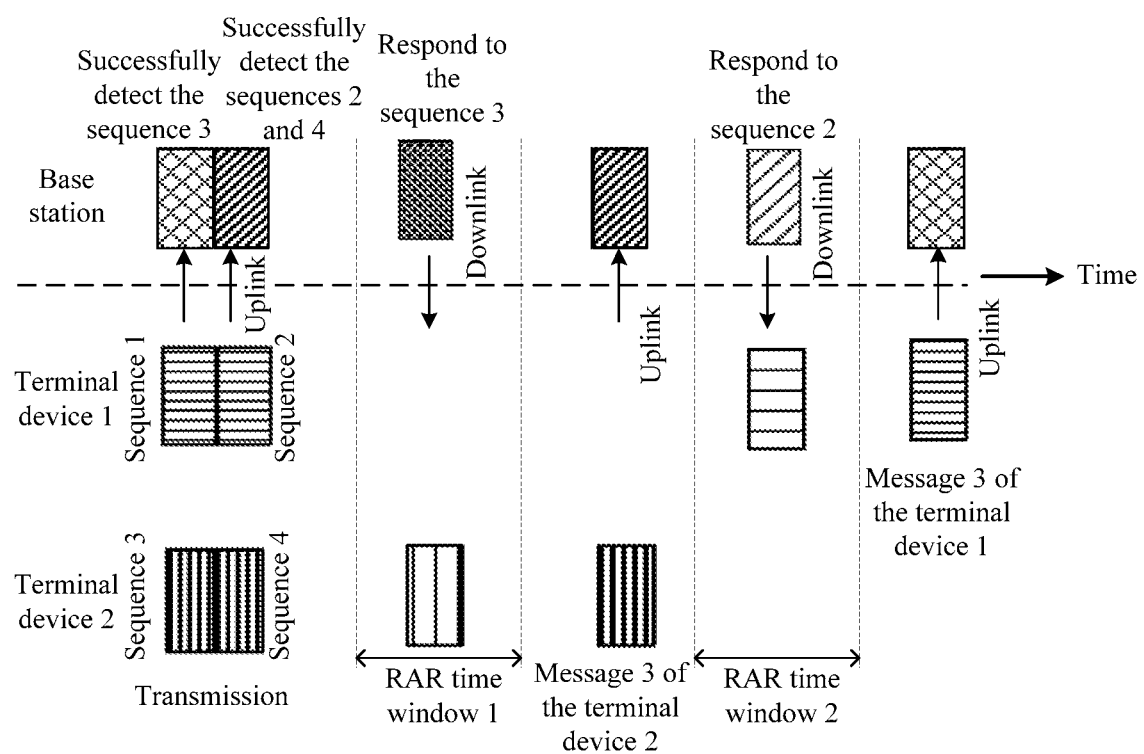
FIG. 5(a) is a schematic diagram of an implementation of responding by a base station to a plurality of sequences included in a random access preamble sent by each of two terminal devices, according an embodiment of the present invention.
Figure 5B:
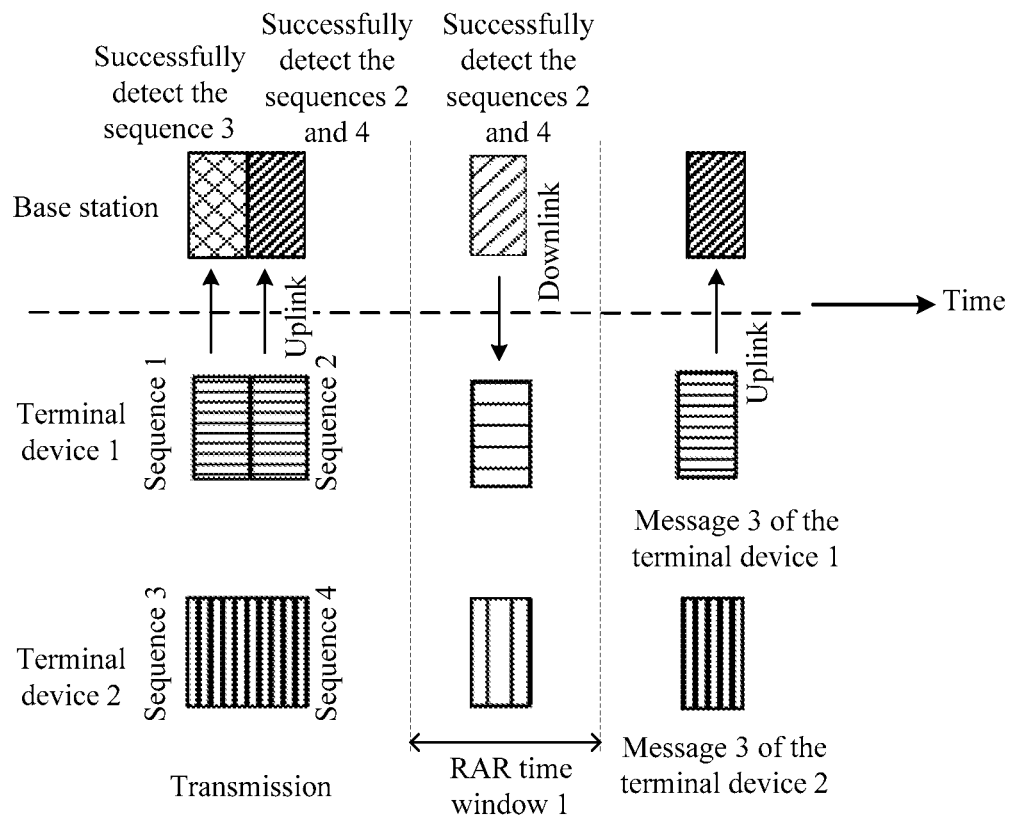
FIG. 5(b) is a schematic diagram of another implementation of responding by a base station to a plurality of sequences included in a random access preamble sent by each of two terminal devices, according an embodiment of the present invention.

The following uses an example in which the base station successfully detects the sequence 2 sent by the terminal device 1, and the sequence 3 and the sequence 4 that are sent by the terminal device 2, to describe a manner in which a base station responds to random access preambles sent by terminal devices. For example, in FIG. 5(a) and FIG. 5(b), for the preamble sent by the terminal device 1, the base station successfully detects the sequence 3; and for the preamble sent by the terminal device 2, the base station successfully detects the sequence 2 and the sequence 4. As shown in FIG. 5(a) and FIG. 5(b), an order of time is represented from left to right, and different rectangular blocks represent different beams.

In FIG. 5(a), the base station first responds to the successfully detected sequence 3 in the preamble sent by the terminal device 2. After successfully receiving, within a corresponding RAR receiving time, a response corresponding to the sequence 3, the terminal device 2 sends a message 3 on a resource indicated by an uplink grant included in the response. The resource indicated by the uplink grant may be a time-frequency resource that the base station instructs the terminal device 2 to use to send the message 3. The message 3 of the terminal device 2 includes information about a sequence that has been sent by the terminal device 2 but has not yet been responded to, for example, a sending time, a sending frequency, an index, or a power headroom of the sequence 4. After receiving the message 3 of the terminal device 2, the base station determines, based on the information in the message 3, that the detected sequence 4 and sequence 3 are sent by the terminal device 2, and that the terminal device 2 has been responded to. In this case, the base station responds only to the successfully detected sequence 2 in a response to the preambles sent by the terminal devices.

In some embodiments, the message 3 sent by the terminal device 2 to the base station may further include a power headroom of the sequence 3. Hence, after receiving the message 3 sent by the terminal device 2, the base station selects, based on the power headroom of the sequence 3 and the power headroom of the sequence 4 in combination with signal quality of the successfully detected sequence 3 and sequence 4, a receive beam with a small path loss as a receive beam for receiving a message sent by the terminal device 2.

In some embodiments, if the base station fails to receive the message 3 sent by the terminal device 2, the base station may further send an RAR to the sequence 3 again in another downlink transmit beam.

In some embodiments, the response of the base station to the sequence 3 may be sent by using a plurality of downlink transmit beams.

After finishing responding to the sequence 3, the base station responds only to the sequence 2 in a next response.

In FIG. 5(b), the base station first responds to the successfully detected sequence 2 and sequence 4 in the preambles sent by the terminal device 1 and the terminal device 2. After successfully receiving, within a corresponding RAR receiving time, a response of the base station to the sequence 4, the terminal device 2 sends a message 3 on a resource indicated by an uplink grant included in the response sent by the base station. The resource indicated by the uplink grant may be a time-frequency resource that the base station instructs the terminal device 2 to use to send the message 3. The sent message 3 includes information about the sequence 3 that has been sent by the terminal device 2 but has not yet been responded to, for example, a sending time, a sending frequency, an index, or a corresponding power headroom of the sequence 3. Hence, the base station can learn, based on the information about the sequence 3 carried in the message 3, that the sequence 3 and the sequence 4 are preambles sent by one terminal device (the terminal device 2), and does not need to respond to the sequence 3. Similarly, after successfully receiving, within a corresponding RAR receiving time, a response of the base station to the sequence 2, the terminal device 1 sends a message 3 on a resource indicated by an uplink grant included in the response sent by the base station. The sent message 3 includes information about the sequence 1 that has been sent by the terminal device 1 but has not yet been responded to. Herein, because the base station has not detected the sequence 1, the sequence 1 does not need to be responded to, that is, an RAR to the sequence 1 does not need to be sent. Further, the message 3 sent by the terminal device 2 may further include a power headroom of the sequence 4. Hence, the base station may select, based on the power headroom of the sequence 3 and the sequence 4 in combination with signal quality of the successfully detected preambles, a receive beam for receiving a message sent by the terminal device 2. Because the base station has not detected the sequence 1 and has not detected signal quality of the sequence 1, there is no need to change a receive beam.

In some embodiments, if the base station fails to receive the message 3 sent by the terminal device 1, the base station may further send an RAR to the sequence 2 again in another downlink transmit beam. Alternatively, if the base station fails to receive the message 3 sent by the terminal device 2, the base station may further send an RAR to the sequence 4 again in another downlink transmit beam.

In some embodiments, the response of the base station to the sequence 2 may be sent by using a plurality of downlink transmit beams, and the response of the base station to the sequence 4 may also be sent by using a plurality of downlink transmit beams.

In another embodiment, the base station may determine, based on signal strengths of detected preambles or sequences, or an order of reception of preambles or sequences, an order for responding to the preambles or the sequences; or determine, based on information (including but not limited to information such as priorities, or quantities of preambles or sequences detected within receive beams, or schedulable resources within beams) carried by detected preambles or sequences, whether to first respond to some or all detected preambles or sequences.

The embodiments shown in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), and FIG. 5(b) are implementations when one or more terminal devices each send a plurality of preambles or one preamble including a plurality of sequences to one base station. When a terminal device is located in coverage areas of two or more base stations, the terminal device may send a plurality of preambles or one preamble including a plurality of sequences to each of the two base stations. In this case, each of the two base stations may implement responding by using the implementations for the base station in the embodiments described in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), and FIG. 5(b).

In addition, to further improve efficiency of responding to random access preambles of terminal devices by base stations, the two or more base stations may respond no more, through exchange of messages, to a preamble or a sequence to which a response has been sent.

The following description uses an example in which two base stations each receive preambles sent by two terminal devices. The following description uses an example in which a terminal device 1 has obtained random access configuration information from a base station 1, and a terminal device 2 has obtained random access configuration information from a base station 2. The random access configuration information obtained by the terminal device 1 from the base station 1 indicates transmit power of the terminal device 1 for sending a preamble to the base station 1, a time for receiving a random access response (for example, an RAR time window), and the like. The random access configuration information obtained by the terminal device 2 from the base station 2 indicates transmit power of the terminal device 2 for sending a preamble to the base station 2, a time for receiving a random access response (for example, an RAR time window), and the like.

Figure 6A:
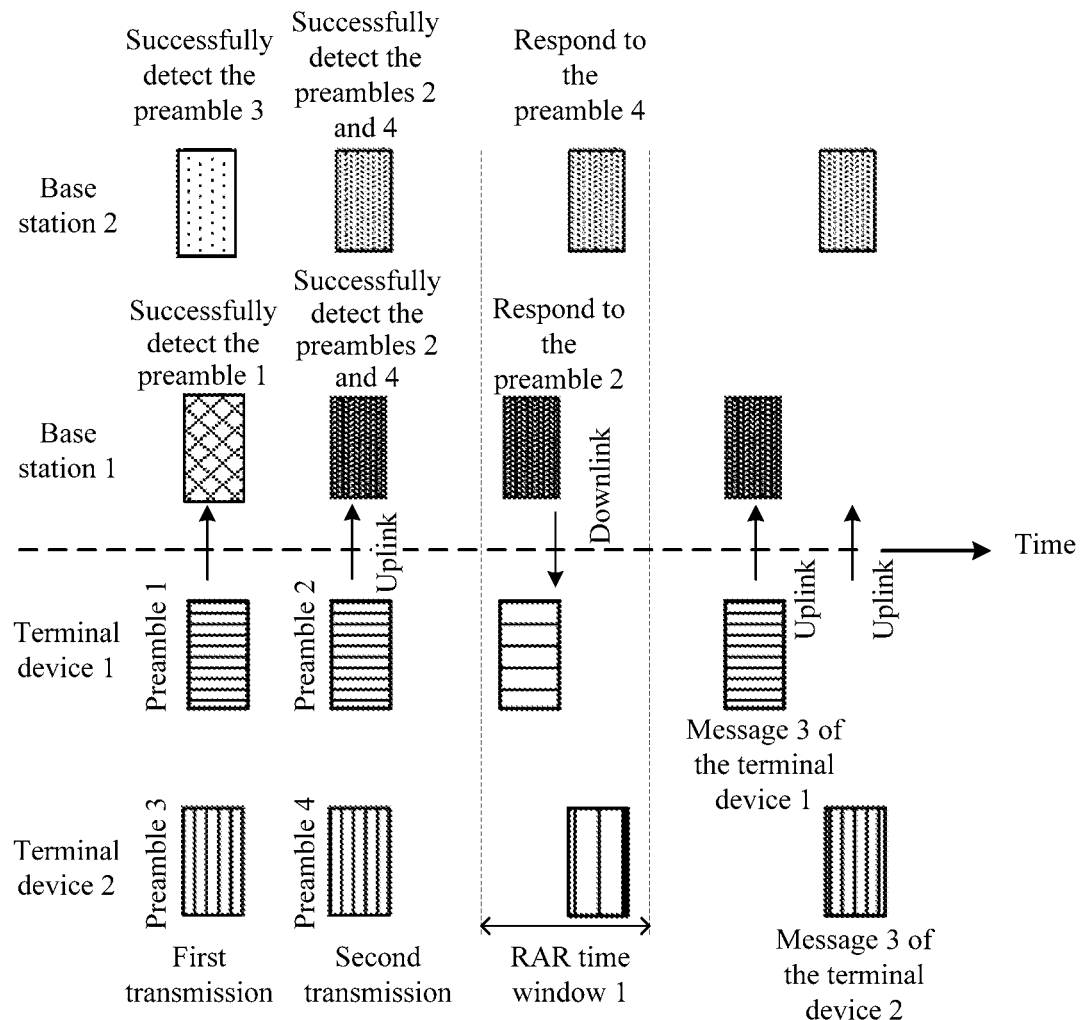
FIG. 6(a) is a schematic diagram of an implementation of responding by two base stations to a plurality of random access preambles sent by each of two terminal devices, according an embodiment of the present invention.

As shown in FIG. 6(a), the base station 1 receives preambles 1 and 2 from the terminal device 1, and a preamble 4 from the terminal device 2; and the base station 2 receives a preamble 2 from the terminal device 1, and preambles 3 and 4 from the terminal device 2. The base station 1 responds to the preamble 2, that is, sends a response to the preamble 2 to the terminal device 1; and the base station 2 responds to the preamble 4, that is, sends a response to the preamble 4 to the terminal device 2. After receiving the corresponding RARs, the terminal device 1 and the terminal device 2 each send a message 3.

The message 3 sent by the terminal device 1 to the base station 1 includes information about the preamble 1 that has been sent but has not yet been responded to. The information includes but is not limited to at least one of a time, a frequency, an index, and a power headroom of the preamble 1. For example, at least one of the sending time, the sending frequency, the index, and the power headroom that are of the preamble 1. After receiving the message 3 of the terminal device 1, the base station 1 determines, based on the information in the message 3, that the detected preamble 2 and preamble 1 are sent by one terminal device, and that the terminal device has been responded to. The message 3 sent by the terminal device 2 to the base station 2 includes information about the preamble 3 that has been sent but has not yet been responded to. The information includes but is not limited to at least one of a time, a frequency, an index, and a power headroom of the preamble. For example, at least one of the sending time, the sending frequency, the index, and the power headroom of the preamble 3. After receiving the message 3 of the terminal device 2, the base station 2 determines, based on the information in the message 3, that the detected preamble 3 and preamble 4 are sent by one terminal device, and that the terminal device has been responded to.

After receiving the message 3 sent by the terminal device 1, the base station 1 does not respond to the preamble 1, in view of the information about the preamble 1 carried in the message 3 sent by the terminal device 1. After receiving the message 3 sent by the terminal device 2, the base station 2 does not respond to the preamble 3, in view of the information about the preamble 3 carried in the message 3 sent by the terminal device 2.

For implementations of responding, by each base station, to the preambles sent by the terminal devices in FIG. 6(a), refer to the implementations in FIG. 2(a), FIG. 2(b), FIG. 2(c), FIG. 4(a), FIG. 4(b), and FIG. 4(c). For example, the message 3 sent by the terminal device 1 to the base station 1 may further include a power headroom of the preamble 2. Hence, after receiving the message 3 sent by the terminal device 1, the base station 1 selects, based on the power headroom of the preamble 2 and the power headroom of the preamble 1 in combination with signal quality of the successfully detected preamble 1 and preamble 2, a receive beam with a small path loss as a receive beam for receiving a message sent by the terminal device 1. For another example, the message 3 sent by the terminal device 2 to the base station 2 may further include a power headroom of the preamble 4. Hence, after receiving the message 3 sent by the terminal device 2, the base station 2 selects, based on the power headroom of the preamble 3 and the power headroom of the preamble 4 in combination with signal quality of the successfully detected preamble 3 and preamble 4, a receive beam with a small path loss as a receive beam for receiving a message sent by the terminal device 2.

The following describes a difference between FIG. 6(a) and the foregoing implementations. The base station 1 and the base station 2 may exchange messages. In some embodiments, the base station 1 sends, to the base station 2, a message indicating that the preamble 1 and the preamble 2 of the terminal device 1 have been responded to; and the base station 2 sends, to the base station 1, a message indicating that the preamble 3 and the preamble 4 of the terminal device 2 have been responded to. Hence, the base station 2 may not need to respond to the preamble 2 of the terminal device 1, and the base station 1 may not need to respond to the preamble 4 of the terminal device 2, either. It should be noted that a plurality of manners are available for the base station 1 and the base station 2 to exchange messages. For example, the base station 1 and the base station 2 may exchange messages through a backhaul link. A specific manner in which the base station 1 and the base station 2 exchange messages is not limited in this embodiment of this application.

In one implementation, for example, in the implementation in FIG. 6(a), alternatively, only the preamble 1 and the preamble 2 are configured at the base station 1, and only the preamble 3 and the preamble 4 are configured at the base station 2. For example, the base station 1 detects the preamble 1 and the preamble 4, and the base station 2 detects the preamble 2 and the preamble 3. When detecting information about the preamble 4, the base station 1 notifies the base station 2 or notifies a third-party processing device of some information detected by the base station 1, including but not limited to information such as an ID, a time-frequency resource location, and RSRP that are corresponding to the preamble 4, and resources schedulable by the base station 1 (including but not limited to a subframe and a bandwidth that can be used for uplink transmission within the base station 1). After receiving a message sent by the base station 1, the base station 2 responds to the preamble 4; or after receiving a message sent by the base station 1, the third-party processing device selects an appropriate base station to respond to the preamble 4. Similarly, when detecting information about the preamble 2, the base station 2 notifies the base station 1 or notifies a third-party processing device of some information of the preamble 2, including but not limited to information such as an ID, a time-frequency resource location, and RSRP that are corresponding to the preamble 2, and resources schedulable by the base station 2 (including but not limited to a subframe and a bandwidth that can be used for uplink transmission within the base station 2). After receiving a message sent by the base station 2, the base station 1 responds to the preamble 2; or after receiving a message sent by the base station 2, the third-party processing device selects an appropriate base station to respond to the preamble 2.

For a preamble that is detected by both the two base stations, the base station 1 and the base station 2 each select, based on information about preambles detected by themselves and information obtained from the other party, a detected preamble for responding to; or the third-party processing device selects an appropriate base station, and instructs the base station to respond. The base stations or the third-party device may select a detected preamble based on the resources schedulable by each base station, signal received quality of preambles, and the like.

In this embodiment, the third-party device is a device responsible for resource (including but not limited to random access resources, for example, time, frequency, and preamble resources) scheduling, configuration, and processing functions between base stations. For example, the third-party device may be a base station with resource scheduling and configuration functions at a radio resource control (Radio resource control, RRC) layer, and the base station 1 and the base station 2 are merely base stations with some functions (for example, generation, transmission, reception, and processing of signals at a media access control (Media access control, MAC) layer and/or a physical layer).

In one implementation, the base station 1 or the base station 2 may send the received message 3 to the third-party device. The third-party device determines whether to respond to other preambles detected by the base stations.

Figure 6B:
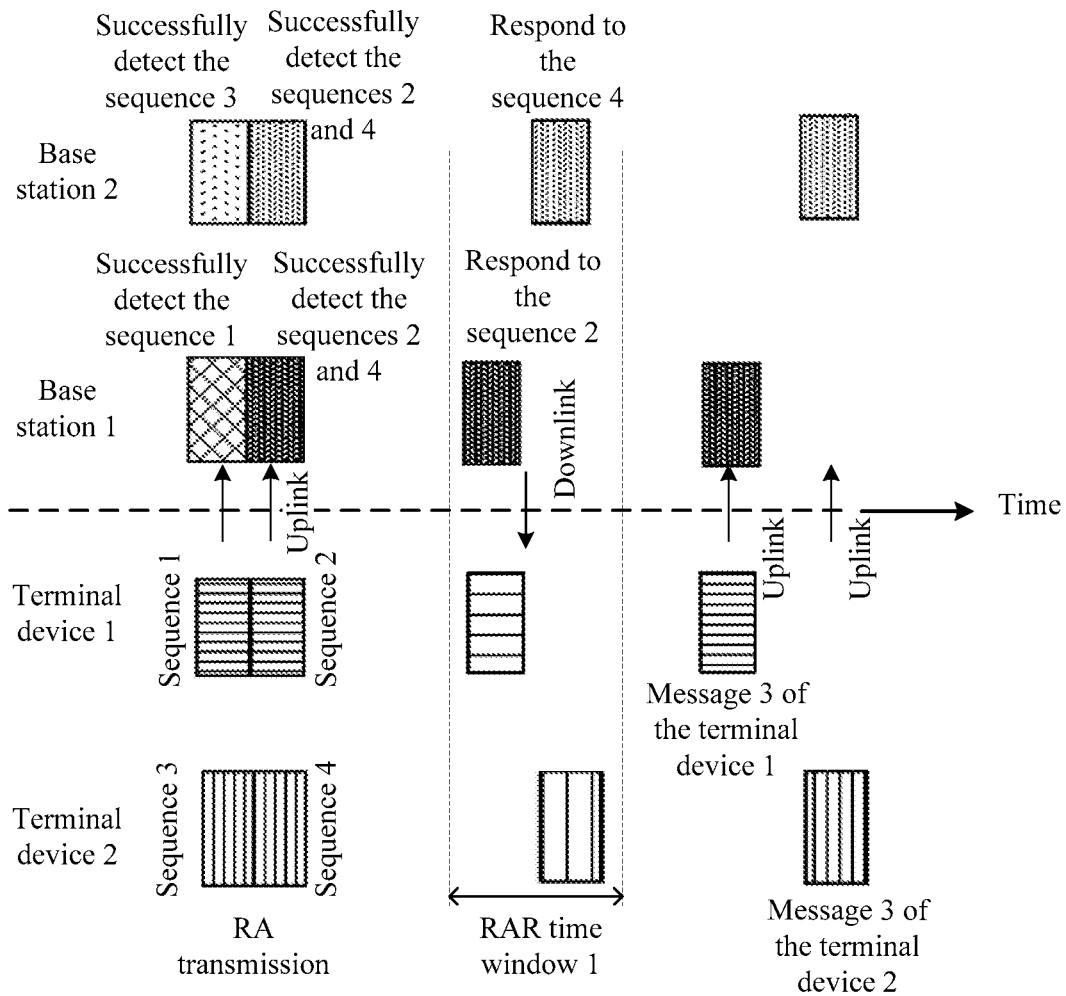
FIG. 6(b) is a schematic diagram of an implementation of responding by two base stations to a plurality of sequences included in a random access preamble sent by each of two terminal devices, according an embodiment of the present invention.

As shown in FIG. 6(b), the terminal device 1 sends one preamble that includes a sequence 1 and a sequence 2; and the terminal device 2 sends one preamble that includes a sequence 3 and a sequence 4. The base station 1 and the base station 2 each use two receive beams to receive one sequence in the preamble. For example, the base station 1 receives the sequences 1 and 2 from the terminal device 1, and the sequence 4 from the terminal device 2; and the base station 2 receives the sequence 2 from the terminal device 1, and the sequences 3 and 4 from the terminal device 2. The base station 1 responds to the sequence 2, that is, sends a response to the sequence 2 to the terminal device 1; and the base station 2 responds to the sequence 4, that is, sends a response to the sequence 4 to the terminal device 2. After receiving the corresponding RARs, the terminal device 1 and the terminal device 2 each send a message 3.

The message 3 sent by the terminal device 1 to the base station 1 includes information about the sequence 1 that has been sent but has not yet been responded to. The information includes but is not limited to at least one of a time, a frequency, an index, and a power headroom of the sequence 1. For example, at least one of the sending time, the sending frequency, the index, and the power headroom of the sequence 1. After receiving the message 3 of the terminal device 1, the base station 1 determines, based on the information in the message 3, that the detected sequence 2 and sequence 1 are sent by one terminal device, and that the terminal device has been responded to. The message 3 sent by the terminal device 2 to the base station 2 includes information about the sequence 3 that has been sent but has not yet been responded to. The information includes but is not limited to at least one of a time, a frequency, an index, and a power headroom of the sequence. For example, at least one of the sending time, the sending frequency, the index, and the power headroom of the sequence 3. After receiving the message 3 of the terminal device 2, the base station 2 determines, based on the information in the message 3, that the detected sequence 3 and sequence 4 are sent by one terminal device, and that the terminal device has been responded to.

After receiving the message 3 sent by the terminal device 1, the base station 1 does not respond to the sequence 1, in view of the information about the sequence 1 carried in the message 3 sent by the terminal device 1. After receiving the message 3 sent by the terminal device 2, the base station 2 does not respond to the sequence 3, in view of the information about the sequence 3 carried in the message 3 sent by the terminal device 2.

For implementations of responding, by each base station, to the sequences sent by the terminal devices in FIG. 6(b), refer to the implementations in FIG. 3(a), FIG. 3(b), FIG. 3(c), FIG. 5(a), and FIG. 5(b). For example, the message 3 sent by the terminal device 1 to the base station 1 may further include a power headroom of the sequence 2. Hence, after receiving the message 3 sent by the terminal device 1, the base station 1 selects, based on the power headroom of the sequence 2 and the power headroom of the sequence 1 in combination with signal quality of the successfully detected sequence 1 and sequence 2, a receive beam with a small path loss as a receive beam for receiving a message sent by the terminal device 1. For another example, the message 3 sent by the terminal device 2 to the base station 2 may further include a power headroom of the sequence 4. Hence, after receiving the message 3 sent by the terminal device 2, the base station 2 selects, based on the power headroom of the sequence 3 and the power headroom of the sequence 4 in combination with signal quality of the successfully detected sequence 3 and sequence 4, a receive beam with a small path loss as a receive beam for receiving a message sent by the terminal device 2.

The following describes a difference between FIG. 6(b) and the foregoing implementations. The base station 1 and the base station 2 may exchange messages. Specifically, the base station 1 sends, to the base station 2, a message indicating that the sequence 1 and the sequence 2 of the terminal device 1 have been responded to; and the base station 2 sends, to the base station 1, a message indicating that the sequence 3 and the sequence 4 of the terminal device 2 have been responded to. Hence, the base station 2 may not need to respond to the sequence 1 and the sequence 2 of the terminal device 1, and the base station 1 may not need to respond to the sequence 3 and the sequence 4 of the terminal device 2, either. It should be noted that a plurality of manners are available for the base station 1 and the base station 2 to exchange messages. For example, the base station 1 and the base station 2 may exchange messages through a backhaul link. A specific manner in which the base station 1 and the base station 2 exchange messages is not limited in this embodiment of this application.

In some embodiments, alternatively, only the sequence 1 and the sequence 2 are configured at the base station 1, and only the sequence 3 and the sequence 4 are alternatively configured at the base station 2. In this case, an implementation is similar to that in FIG. 6(a), and details are not further described.

In one implementation, in FIG. 6(a) and FIG. 6(b), after receiving the messages 3 sent by the terminal devices, the base stations may independently determine whether to continue responding to other successfully detected preambles or sequences; or may request the other base station or the plurality of base stations to share messages 3 before determining whether to continue responding to other detected preambles or sequences; or may notify a third-party device of the messages 3, so that the third-party device determines whether to respond to other preamble or sequences detected by the base stations. In this case, the third-party device determines, based on the received messages 3, the preambles or the sequences that have been responded to, and instructs base stations that have successfully detected the preambles or the sequences but have not yet responded, not to respond to the preambles or the sequences that have been responded to by other base stations.

It should be noted that, in this embodiment of this application, when a preamble received by the base station 1 or the base station 2 includes two sequences, and random access to the base station 1 and the base station 2 has identical time and frequency locations, to reduce interference between the two base stations caused by random access of the terminal devices, the two base stations may use different preambles and/or sequences to reduce the interference.

For example, one preamble includes N sequences, and the N sequences included in the preamble may be denoted as s1, s2, . . . , sN. N is an integer, for example, N may be 1, 2, or 70. When one preamble includes two sequences, the preamble may be denoted as [si, sj]. Downlink system information of the base station 1 indicates that preambles that can be used by the base station are {[s1, s2], [s2, s3], . . . , [sN, s1]}, which are N preambles in total. Downlink system information of the base station 2 indicates that preambles that can be used by the base station are {[s1, s3], [s2, s4], . . . , [sN, s2]}, which are N preambles in total. In other words, the $i^{th}$ base station uses a preamble set {[s1, $s_{1+K(i)}$], [s2, $s_{2+K(i)}$], . . . , [sN, $s_{N+K(i)}$]}, where K(i) is an offset value corresponding to the $i^{th}$ base station. In this way, any preamble in the base station 1 and any preamble of the preambles in the base station 2 have a sequence in common at a maximum of one location. This can reduce interference between different base stations caused by random access of the terminal devices. In other words, different preambles and/or sequences are used for two terminal devices each located in two base stations. In the foregoing descriptions, that a length of each preamble is 2 is only an example. In specific implementation, each preamble may alternatively include a plurality of sequences. A specific implementation thereof is similar to the implementation in the case of two sequences, and details are not further described.

For an implementation when at least three base stations receive preambles or sequences of at least two terminal devices, refer to the foregoing implementation in the case of two base stations. Details are not further described.

An embodiment of the present invention further provides a random access responding method, including the following steps.

S100: Receive at least two random access preambles before responding to random access of a terminal device, where each of the at least two random access preambles includes at least one sequence; or receiving one random access preamble before responding to random access of a terminal device, where the one random access preamble includes at least two sequences.

S102: Check for the sequences in the received random access preambles.

S104: Respond to a successfully detected sequence or a random access preamble that includes a successfully detected sequence.

With this method, effective responding to a plurality of random access preambles or a plurality of sequences included in one random access preamble can be implemented.

For specific implementations of the foregoing random access responding method, refer to the implementations of responding to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Particularly, refer to the implementations of responding by a base station(s) to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Details are not further described.

An embodiment of the present invention further provides a random access method, including the following steps.

S200: Send at least two random access preambles before a base station responds to random access, where each of the at least two random access preambles includes at least one sequence; or sending one random access preamble before a base station responds to random access, where the one random access preamble includes at least two sequences.

S202: Receive a message of the base station for responding to a successfully detected sequence or a random access preamble that includes a successfully detected sequence.

With this method, when a plurality of random access preambles are sent, or when one random access preamble includes a plurality of sequences, a message of the base station for responding to a successfully detected sequence or a random access preamble that includes a successfully detected sequence can be effectively received.

For specific implementations of the foregoing random access method, refer to the implementations of responding to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Particularly, refer to the implementations of responding by a terminal device(s) to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Details are not further described again.

Figure 7:
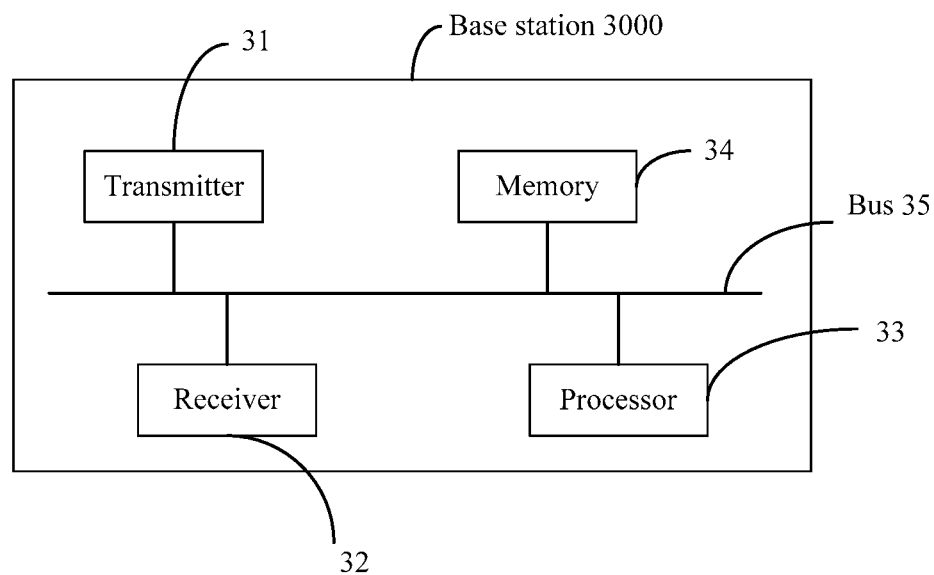
FIG. 7 is a schematic structural diagram of a base station 3000 according to an embodiment of the present invention.

FIG. 7 is a schematic structural diagram of a base station 3000 according to an embodiment of the present invention. The base station 3000 may include a transmitter 31, a receiver 32, a processor 33, and a memory 34. The transmitter 31, the receiver 32, the processor 33, and the memory 34 are connected to each other by a bus 35.

The memory 34 includes but is not limited to a random access memory (Random Access Memory, RAM), a read-only memory (Read-Only Memory, ROM), an erasable programmable read-only memory (Erasable Programmable Read Only Memory, EPROM), or a portable read-only memory (Compact Disc Read-Only Memory, CD-ROM). The memory 34 is configured to store a related instruction and related data. The transmitter 31 is configured to send data and/or a signal, for example, send a random access response message. The receiver 32 is configured to receive data and/or a signal, for example, receive a random access message.

The processor 33 may include one or more processors, for example, include one or more central processing units (Central Processing Unit, CPU). When the processor 33 is one CPU, the CPU may be a single-core CPU or a multi-core CPU.

The processor 33 in the base station 3000 is configured to read program code stored in the memory 34, to perform the following operations:

receiving at least two random access preambles before responding to random access of a terminal device, where each of the at least two random access preambles includes at least one sequence; or receiving one random access preamble before responding to random access of a terminal device, where the one random access preamble includes at least two sequences;

checking for the sequences in the received random access preambles; and responding to a successfully detected sequence or a random access preamble that includes a successfully detected sequence.

For specific implementations of the base station 3000 in FIG. 7, refer to the implementations of responding to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Particularly, refer to the implementations of responding by a base station(s) to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Details are not further described again.

Figure 8:
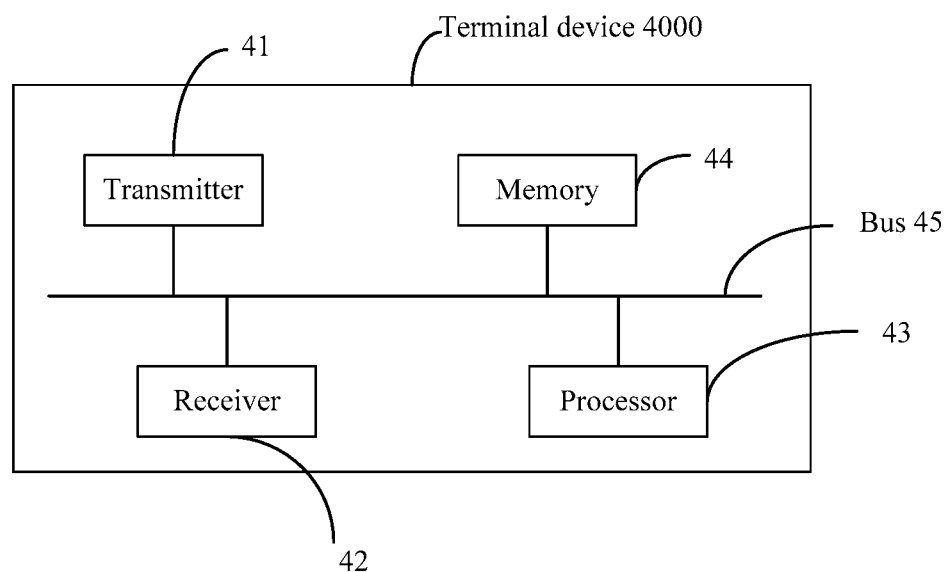
FIG. 8 is a schematic structural diagram of a terminal device 4000 according to an embodiment of the present invention.

FIG. 8 is a schematic structural diagram of a terminal device 4000 according to an embodiment of the present invention. The terminal device 4000 may include a transmitter 41, a receiver 42, a processor 43, and a memory 44. The transmitter 41, the receiver 42, the processor 43, and the memory 44 are connected to each other by a bus 45.

The memory 44 includes but is not limited to a random access memory, a read-only memory, an erasable programmable read-only memory, or a portable read-only memory. The memory 44 is configured to store a related instruction and related data. The transmitter 41 is configured to send a message such as a random access preamble, and the receiver 42 is configured to receive a message such as a random access response.

The processor 43 may be one or more central processing units. When the processor 43 is one CPU, the CPU may be a single-core CPU or a multi-core CPU.

The processor 43 in the terminal device 4000 is configured to read program code stored in the memory 44, to perform the following operations:

sending at least two random access preambles before a base station responds to random access, where each of the at least two random access preambles includes at least one sequence; or sending one random access preamble before a base station responds to random access, where the one random access preamble includes at least two sequences; and receiving a message of the base station for responding to a successfully detected sequence or a random access preamble that includes a successfully detected sequence.

For specific implementations of the terminal device 4000 in FIG. 8, refer to the implementations of responding to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Particularly, refer to the implementations of by a terminal device(s) to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Details are not further described.

Figure 9:
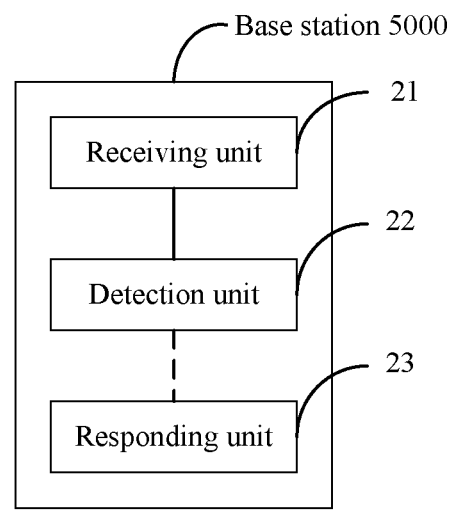
FIG. 9 is a schematic structural diagram of a base station 5000 according to an embodiment of the present invention.

FIG. 9 is a schematic structural diagram of a base station 5000 according to an embodiment of the present invention. As shown in FIG. 9, the base station 5000 includes:

a receiving unit 21, configured to: receive at least two random access preambles before responding to random access of a terminal device, where each of the at least two random access preambles includes at least one sequence; or receive one random access preamble before responding to random access of a terminal device, where the one random access preamble includes at least two sequences;

a detection unit 22, configured to check for the sequences in the random access preamble received by the receiving unit 21; and a responding unit 23, configured to respond to a sequence successfully detected by the detection unit 22, or a random access preamble that includes a successfully detected sequence.

In some embodiments, the responding unit 23 is further configured to: when receiving a plurality of random access preambles or a plurality of sequences sent by one terminal device, respond to only one random access preamble or only one sequence.

This can avoid repeated responding, reducing resource consumption of the base station 5000.

In some embodiments, the responding unit 23 is further configured to respond, through at least two downlink transmissions, to the successfully detected sequence or the random access preamble that includes a successfully detected sequence.

In some embodiments, the receiving unit 21 is further configured to: receive a message that is sent by the terminal device after the terminal device receives a random access response, where the message includes information about a random access preamble or a sequence that has been sent by the terminal device but has not yet been responded to.

The responding unit 23 is further configured to skip responding to a successfully detected random access preamble or sequence that is included in the message and that has been sent by the terminal device but has not yet been responded to.

In some embodiments, the information about the random access preamble or the sequence that is included in the message and that has been sent by the terminal device but has not yet been responded to includes at least one of the following items of information: a sending time, a sending frequency, an index, and a power headroom of the random access preamble or the sequence that has been sent but has not yet been responded to.

In some embodiments, the receiving unit 21 is further configured to select, based on a power headroom of a successfully detected random access preamble or sequence that is included in the message, and signal received quality of the successfully detected random access preamble or sequence, a beam for receiving random access sent by the terminal device.

In some embodiments, the base station 5000 is further configured to: when at least two base stations each receive a plurality of random access preambles or a plurality of sequences sent by one terminal device, send, to another base station, a random access preamble or a sequence that has been responded to, or receive a random access preamble or a sequence that is sent by another base station and that has been responded to.

The responding unit 23 is further configured to skip responding to the random access preamble or the sequence that has been responded to.

In some embodiments, the base station 5000 is further configured to: when at least two base stations each receive a plurality of random access preambles or a plurality of sequences sent by one terminal device, send information about a successfully detected random access preamble or sequence to a third-party device. The third-party device determines a base station that is to respond to the successfully detected random access preamble or sequence.

The third-party device is a device responsible for resource scheduling, configuration, and/or processing functions between base stations.

In some embodiments, a random access preamble response sent by the responding unit 23 includes at least one of the following pieces of information: an index number corresponding to a random access preamble, signal received quality of the random access preamble, and a time and/or frequency domain location of the random access preamble; or includes at least one of the following pieces of information: an index number of a sequence, signal received quality of the sequence, and a time and/or frequency domain location of the sequence.

In some embodiments, the responding unit 23 determines an order for sending random access preamble responses, based on one of the following pieces of information:

a time order of reception of random access preambles, strengths of detected signals, priority information carried in detected random access preambles, or a quantity of random access preambles detected within one receive beam.

For specific implementations of the base station 5000 in FIG. 9, refer to the implementations of responding to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Particularly, refer to the implementations of responding by a base station(s) to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Details are not further described again.

Figure 10:
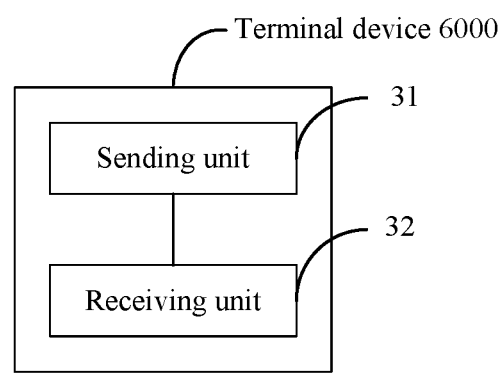
FIG. 10 is a schematic structural diagram of a terminal device 6000 according to an embodiment of the present invention.

FIG. 10 is a schematic structural diagram of a terminal device 6000 according to an embodiment of the present invention. As shown in FIG. 10, the terminal device 6000 includes:

a sending unit 31, configured to: send at least two random access preambles before a base station responds to random access, where each of the at least two random access preambles includes at least one sequence; or send one random access preamble before a base station responds to random access, where the one random access preamble includes at least two sequences; and a receiving unit 32, configured to receive a message of the base station for responding to a successfully detected sequence or a random access preamble that includes a successfully detected sequence.

In some embodiments, the receiving unit 32 is further configured to receive the message, for responding to the successfully detected sequence or the random access preamble that includes a successfully detected sequence, sent by the base station through at least two downlink transmissions.

In some embodiments, the sending unit 31 is further configured to: after receiving the message for responding to the successfully detected sequence or the random access preamble that includes a successfully detected sequence, send a message to the base station, where the message includes information about a random access preamble or a sequence that has been sent by the terminal device but has not yet been responded to.

In some embodiments, the information about the random access preamble or the sequence that is included in the message and that has been sent by the terminal device but has not yet been responded to includes at least one of the following items of information: a sending time, a sending frequency, an index, and a power headroom of the random access preamble or the sequence that has been sent but has not yet been responded to, and a power headroom of the random access preamble or the sequence that has been responded to.

In some embodiments, the sending unit 31 is further configured to:

when the received message carries signal received quality RSRP, obtain, based on the RSRP and transmit power for sending the random access preambles or the sequences, a path loss corresponding to each transmit beam, and select a transmit beam with a small path loss to send a subsequent message.

For specific implementations of the terminal device 6000 in FIG. 8, refer to the implementations of responding to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Particularly, refer to the implementations of by a terminal device(s) to random access preambles or sequences in the scenarios in FIG. 2(a), FIG. 2(b), FIG. 2(c), FIG. 3(a), FIG. 3(b), FIG. 3(c), FIG. 4(a), FIG. 4(b), FIG. 4(c), FIG. 5(a), FIG. 5(b), FIG. 6(a), and FIG. 6(b). Details are not further described.

It should be noted that, in the embodiments of the present invention, for the purpose of clear and brief description, specific examples are used to describe implementation solutions in related scenarios. However, this does not mean that the embodiments of the present invention are limited only to these scenarios. For example, the embodiments of the present invention are described using two random access preambles as an example. In specific implementation, a base station may receive more than two random access preambles, and implementations in this case are similar to the implementations in the case of two random access preambles. For another example, the embodiments of the present invention are described using an example in which one random access preamble includes two sequences. In specific implementation, a base station may receive one random access preamble that includes at least three sequences, and implementations in this case are similar to the implementations in the case of two sequences. Details are not further described.

A person of ordinary skill in the art may be aware that the units and the algorithm steps in the examples described with reference to the embodiments disclosed in this specification can be implemented by electronic hardware, computer software, or a combination thereof. To clearly describe interchangeability between hardware and software, the foregoing has generally described compositions and steps of the examples based on functions. Whether the functions are performed by hardware or software depends on particular applications and design constraints of the technical solutions. A person skilled in the art may use a different method to implement the described functions for each particular application, but it should not be considered that the implementation goes beyond the scope of the present invention.

A person skilled in the art may clearly understand that, for ease and brevity of description, for specific working processes of the system, apparatus, and unit described above, reference may be made to the corresponding processes in the foregoing method embodiments. Details are not further described herein again.

In the several embodiments provided in this application, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or may be integrated into another system, or some characteristics may be ignored or not performed. In addition, the displayed or discussed mutual couplings or direct couplings or communication connections may be indirect couplings or communication connections through some interfaces, apparatuses, or units, and may be implemented in electrical, mechanical, or other forms.

The units described as separate parts may or may not be physically separated, and the parts displayed as units may or may not be physical units, and may be located in one position or distributed on a plurality of network units. Some or all of the units may be selected depending on actual requirements, to achieve the objectives of the solutions in the embodiments of the present invention.

In addition, the functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes instructions for enabling a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A random access responding method, comprising:
receiving at least one random access preamble before responding to random access of a terminal device, wherein each of the at least one random access preamble comprises at least one sequence;
checking for the at least one sequence in the received at least one random access preamble; and
responding, through at least two downlink transmissions, to a successfully detected sequence or a random access preamble that comprises a successfully detected sequence.

2. The method according to claim 1, wherein the method further comprises:
when receiving a plurality of random access preambles or a plurality of sequences sent by one terminal device, responding to only one random access preamble or only one sequence.

3. The method according to claim 1, wherein the successfully detected sequence or a random access preamble is a first successfully detected sequence or a random access preamble and the method further comprises:
receiving a message sent by the terminal device after the terminal device receives a random access response, wherein the message comprises information about a random access preamble or a sequence that has been sent by the terminal device but has not yet been responded to; and
skipping responding to a second successfully detected random access preamble or sequence that is comprised in the message and that has been sent by the terminal device but yet to be responded to.

4. The method according to claim 3, wherein
the information about the random access preamble or the sequence in the message and that has been sent by the terminal device but has not yet been responded to comprises at least one of the following: a sending time, a sending frequency, an index, and a power headroom of the random access preamble or the sequence that has been sent but yet to be responded to.

5. The method according to claim 4, wherein the method further comprises:
selecting, based on a power headroom of a successfully detected random access preamble or sequence in the message, and signal received quality of the successfully detected random access preamble or sequence, a beam for receiving random access sent by the terminal device.

6. The method according to claim 1, wherein
when at least two base stations each receives a plurality of random access preambles or a plurality of sequences sent by one terminal device, the at least two base stations skip responding, through exchange of messages, to a random access preamble or a sequence that has been responded to.

7. The method according to claim 1, wherein
when at least two base stations each receives a plurality of random access preambles or a plurality of sequences sent by one terminal device, the at least two base stations each sends information about a successfully detected random access preamble or sequence to a third-party device, so that the third-party device determines a base station that is to respond to the successfully detected random access preamble or sequence, wherein
the third-party device is a device responsible for resource scheduling, configuration, and/or processing functions between base stations.

8. The method according to claim 7, wherein
a random access preamble response sent by the base station comprises at least one of the following: an index number corresponding to a random access preamble, signal received quality of the random access preamble, and a time and/or frequency domain location of the random access preamble; or comprises at least one of the following pieces of information: an index number of a sequence, signal received quality of the sequence, and a time and/or frequency domain location of the sequence.

9. The method according to claim 8, wherein the method further comprises:
determining an order for sending random access preamble responses, based on one of the following:
a time order of reception of preambles, strengths of detected signals, priority information carried in detected random access preambles, or a quantity of random access preambles detected within one receive beam.

10. The method according to claim 1, wherein:
when two base stations each send a random access preamble that comprises at least two sequences, and random access to the two base stations has identical time and frequency locations, the random access preambles received by the two base stations have only one sequence in common.

11. A random access method, comprising:
sending at least one random access preamble before a base station responds to random access, wherein each of the at least one random access preamble comprises at least one sequence; and
receiving a message of the base station for responding to a successfully detected sequence or a random access preamble that comprises a successfully detected sequence, sent by the base station through at least two downlink transmission.

12. The method according to claim 11, wherein the method further comprises:
after receiving the message for responding to the successfully detected sequence or the random access preamble that comprises a successfully detected sequence, sending a message to the base station, wherein the message comprises information about a random access preamble or a sequence that has been sent by a terminal device but has not yet been responded to.

13. The method according to claim 12, wherein
the information about the random access preamble or the sequence in the message and that has been sent by the terminal device but yet to be responded to comprises at least one of the following: a sending time, a sending frequency, an index, and a power headroom of the random access preamble or the sequence that has been sent but has not yet been responded to, and a power headroom of the random access preamble or the sequence that has been responded to.

14. The method according to claim 13, wherein the method further comprises:
when the received message carries signal received quality RSRP, obtaining, based on the RSRP and transmit power for sending the random access preambles or the sequences, a path loss corresponding to each transmit beam, and selecting a transmit beam with a small path loss to send a subsequent message.

15. A base station, comprising a receiver, a transmitter, a memory, and a processor, wherein the memory stores a set of program code, and the processor is configured to invoke the program code stored in the memory, to perform the following operations:
receiving at least one random access preamble before responding to random access of a terminal device, wherein each of the at least one random access preamble comprises at least one sequence;
checking for the at least one sequence in the received at least one random access preamble;
responding, through at least two downlink transmissions, to a successfully detected sequence or a random access preamble that comprises a successfully detected sequence.

16. The base station according to claim 15, wherein the processor is further configured to perform:
when receiving a plurality of random access preambles or a plurality of sequences sent by one terminal device, responding to only one random access preamble or only one sequence.

17. The base station according to claim 15, wherein the successfully detected sequence or a random access preamble is a first successfully detected sequence or a random access preamble and the processor is further configured to perform:
receiving a message sent by the terminal device after the terminal device receives a random access response, wherein the message comprises information about a random access preamble or a sequence that has been sent by the terminal device but has not yet been responded to; and
skipping responding to a second successfully detected random access preamble or sequence that is comprised in the message and that has been sent by the terminal device but yet to be responded to.

* * * * *